United States Patent
Nguyen et al.

[11] Patent Number: 5,990,202
[45] Date of Patent: Nov. 23, 1999

[54] DUAL ENCAPSULATION TECHNIQUE FOR PREPARING INK-JETS INKS

[75] Inventors: Khe C Nguyen, Los Altos; Sivapackia Ganapathiappan, Mountain View, both of Calif.

[73] Assignee: Hewlett-Packard Company, Palo Alto, Calif.

[21] Appl. No.: 08/998,164

[22] Filed: Dec. 24, 1997

Related U.S. Application Data

[63] Continuation-in-part of application No. 08/962,496, Oct. 31, 1997, abandoned.

[51] Int. Cl.⁶ .................. C08F 265/06; C08F 267/02; C08K 9/10; C08L 51/00
[52] U.S. Cl. .................. 523/201; 523/160; 523/206; 523/207; 525/71; 106/31.27; 106/31.6
[58] Field of Search .................. 523/160, 161, 523/201, 206, 207; 525/71; 106/31.27, 31.6

[56] References Cited

U.S. PATENT DOCUMENTS

| | | | |
|---|---|---|---|
| 3,544,500 | 12/1970 | Osmond et al. | 428/402.24 |
| 4,565,764 | 1/1986 | Nakahara et al. | 430/111 |
| 4,829,101 | 5/1989 | Kraemer et al. | 523/201 |
| 5,424,370 | 6/1995 | Matsumoto et al. | 525/303 |
| 5,432,210 | 7/1995 | Bogan, Jr. | 523/201 |
| 5,461,125 | 10/1995 | Lu et al. | 525/293 |
| 5,536,612 | 7/1996 | Yamaguchi et al. | 430/137 |
| 5,589,522 | 12/1996 | Beach et al. | 523/160 |
| 5,607,999 | 3/1997 | Shimizu et al. | 524/503 |
| 5,616,644 | 4/1997 | Schlarb et al. | 524/522 |
| 5,618,859 | 4/1997 | Maeyama et al. | 523/201 |
| 5,631,309 | 5/1997 | Yanagi et al. | 523/160 |
| 5,708,095 | 1/1998 | Page et al. | 525/301 |
| 5,814,685 | 9/1998 | Satake et al. | 523/201 |
| 5,853,861 | 12/1998 | Held | 428/207 |
| 5,854,308 | 12/1998 | Kuo et al. | 523/161 |

*Primary Examiner*—Vasu Jagannathan
*Assistant Examiner*—Callie E. Shosho

[57] ABSTRACT

Ink-jet inks for ink-jet printing are provided which include a vehicle and a colorant, the colorant encapsulated by or associated with a primer core/shell polymer to form a primer/colorant combination, and the primer/colorant combination, upon printing on a print medium, encapsulated by a durable core/shell polymer. The primer core/shell polymer serves to provide adhesion of the durable core/shell polymer to the colorant and the durable core/shell polymer serves to provide a smear-fast film upon drying of the ink on a print medium. The primer core/shell polymer comprises a hydrophobic core and a hydrophilic shell comprising a polar component, while the durable core/shell polymer comprises a hydrophobic core comprising a low $T_g$ component, which, when homopolymerized, has a glass transition temperature, $T_g$, below 25° C. and a high $T_g$ component, which, when homopolymerized, has a glass transition temperature above 25° C. and a hydrophilic shell selected from the group consisting of neutral shells, cationic shells, and anionic shells.

33 Claims, 1 Drawing Sheet

DUAL ENCAPSULATION TECHNIQUE FOR PREPARING INK-JETS INKS

CROSS-REFERENCE TO RELATED APPLICATION

The present application is a continuation-in-part of application Ser. No. 08/962,496, filed Oct. 31, 1997 now abandoned.

TECHNICAL FIELD

The present invention relates generally to ink-jet ink compositions, and, more particularly, to encapsulation of colorants employed in such inks so as to render the colorants water-dispersive and enable the formation of durable ink films on printed media.

BACKGROUND ART

Core/shell polymers are well-known; such polymers typically have a hydrophilic portion and a hydrophobic portion. Core/shell polymers are commonly used to encapsulate hydrophobic molecules or particles, which are ordinarily not stably suspendable in water, but which, after encapsulation in the core/shell polymer, become stably suspendable in water. Encapsulation occurs when the hydrophobic portion of the polymer associates with the water-insoluble molecule, and the hydrophilic portion of the polymer disperses with water.

U.S. Pat. No. 4,597,794 discloses the dispersion of pigments in an aqueous vehicle, using aqueous binders comprising both hydrophilic and hydrophobic components. The dispersion of the pigment is followed by centrifugation to eliminate the non-dispersed components such as agglomerates. Examples of the hydrophilic component (shell) comprise polymers of monomers having a mainly additively polymerizable vinyl group, into which hydrophilic construction portions such as carboxylic acid groups, sulfonic acid groups, sulfate groups, etc. are introduced by using a predetermined amount of an $\alpha,\beta$-unsaturated monomer such as acrylic acid, methacrylic acid, crotonic acid, itaconic acid, itaconic acid monoester, maleic acid, maleic acid monoester, fumaric acid, fumaric acid monoester, vinyl sulfonic acid, sulfoethyl methacrylate, sulfopropyl methacrylate, sulfonated vinylnaphthalene, etc. Examples of the hydrophobic portion (core) comprise polymers of monomers selected from the group consisting of styrene, styrene derivatives, vinylnaphthalene, vinylnaphthalene derivatives, and $\alpha,\beta$-ethylenic unsaturated carboxylate of aliphatic alcohol having $C_8$–$C_{18}$. In addition to the foregoing monomers, also included are acrylonitrile, vinylidene chloride, $\alpha,\beta$-ethylenic unsaturated carboxylate, vinyl acetate, vinyl chloride, acrylamide, methacrylamide, hydroxyethyl methacrylate, hydroxypropyl methacrylate, glycidyl methacrylate, N-methylol acrylamide, N-butoxymethyl acrylamide, etc.

U.S. Pat. No. 5,082,757 discloses encapsulated toner compositions comprising a core and a hydroxylated polyurethane microcapsule shell derived from the polycondensation of a polyisocyanate and a water soluble carbohydrate. The core comprises a polymer binder, pigment, dye, or mixtures thereof. Examples of the polymer binder include polymerized monomers selected from the group consisting of acrylates, methacrylates, and olefins including styrene and its derivatives.

U.S. Pat. No. 5,461,125 discloses waterborne core-shell latex polymers useful as adhesive films, rather than superdispersion stability. The core comprises a (co)polymer comprising a (meth)acrylate ester, while the shell comprises a copolymer, the copolymer comprising (1) a nitrogen-bearing ethylenically-unsaturated free-radically polymerizable monomer, (2) at least one (meth)acrylate ester of about a $C_1$ to $C_{14}$ alcohol, and (3) an optional ethylenically-unsaturated free-radically polymerizable silane monomer, wherein the nitrogen-bearing ethylenically-unsaturated free-radically polymerizable monomer comprises about 15 to 60 wt % of the shell and wherein the core comprises about 40 to 85 wt % of the weight of the total core-shell latex particle. The polymers obtained by practicing the teachings of the disclosure have molecular weights of 400,000 or more, and the total low T. component (less than $-10°$ C.), where $T_g$ is the glass transition temperature, is greater than 60 wt %.

U.S. Pat. No. 5,656,071 discloses ink compositions useful for ink-jet applications. These compositions include an insoluble pigment and a polymeric dispersant. In one embodiment, the polymeric dispersant comprises block or graft copolymers comprising a hydrophilic polymeric segment (particularly an acrylate or methacrylate copolymer) and a hydrophobic polymeric segment which includes a hydrolytically stable siloxyl substituent.

Heretofore, inkjet printers have not had printing performance and durable print properties of competitive printer technologies. The foregoing cited patents do not provide for useful, durable film-forming properties upon removal of the water or solvent. Film durability includes wet and dry rub resistance, highlighter smear-fastness, lightfastness, and waterfastness (e.g., hot and cold water, under spill, soak, and rub conditions).

In particular, formulating an ink-jet ink often involves compromising competing interests. For example, it is possible to enhance one property, such as durable film-forming of the colorant. However, such enhancement usually results in the degradation of another property, such as stability (kogation or decap—nozzle crusting).

In the use of core/shell polymers to enhance water-dispersibility of water-insoluble or water-non-dispersible species, such as colorants (pigments, water-insoluble dyes, metal particles, and the like), the issue of competing interests also arises. Here, the competing interests lies in adhesion between the colorant and the core/shell polymer versus the ability to form a durable layer of ink on the print medium upon drying. Durable polymers usually do not bond well to colorants, whereas polymers that bond well to colorants usually have poor solvent resistance. Thus, enhancing one of these properties has been found to result in a degradation of the other.

Thus, there is a need to provide an improved core/shell polymer for encapsulating water-insoluble and water-non-dispersible colorants while enabling the formation of an ink capable of forming durable, smear-fast films of ink on the print medium upon drying.

DISCLOSURE OF INVENTION

In accordance with the invention, ink-jet ink compositions are provided which employ specific core/shell polymer formulations that (1) enhance adhesion between the colorant and the core/shell polymer and (2) form durable, smear-fast films on the print medium upon drying. The ink-jet ink compositions employ a dual encapsulation, comprising a primer core/shell polymer that coats the colorant and a durable core/shell polymer that encapsulates the coated colorant upon printing. The primer core/shell polymer promotes increased adhesion between the colorant and the durable core/shell polymer, allowing the durable core/shell polymer to be tailored to maximize its durable, smear-fast, film-forming properties.

The durable core/shell polymer has at least a hydrophobic portion and either a hydrophilic portion, or, alternatively, one or more surfactants conjunction with the durable polymer. The durable core/shell polymer provides the combined functionalities of stable water dispersibility over a wide range of operating temperatures and durable film formation at ambient conditions upon drying. Specifically, the durable core/shell polymer functions under a wide range of temperatures and ink chemistries typical of thermal ink-jet inks. Furthermore, the durable core/shell polymer disperses the otherwise non-water-dispersible colorants, including pigments and dyes.

The primer core/shell polymer, or adhesion promotion layer, provides a strong bond to the colorant, provides a bonding surface for the outer layer (smear-fast core/shell polymer), and includes a water-soluble component. The smear-fast core/shell polymer, or durable film-forming layer, is primarily hydrophobic, but includes some water-soluble component, and has a controlled glass transition temperature $T_g$. Thus, the adhesion and durability functions are isolated and independently optimized. Water dispersion of the colorant is shared by both layers.

The durable core/shell polymers incorporate the following moieties:

$$[(A)_m(B)_n(C)_p(D)_q(E)_r]_x \qquad (I)$$

wherein A, B, C, D, and E represent functionalities as follows:

A=at least one hydrophobic component contributing to improved durable, film-forming properties selected from moieties which, when homopolymerized to a solid state, have a glass transition temperature ($T_g$) in the range between −100° and +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 90 wt %;
n=10 to 90 wt %;
p=0 to 60 wt %;
q=0 to 50 wt %;
r=0 to 30 wt %;
m+n+p+q+r=100 wt %; and
x=1 to 100,000.

The molecular weight (weight average) of polymer (I) is between about 100 and 2,000,000.

Either the C moiety or the E moiety must be present in the polymer to provide a polymer having either a hydrophilic portion or a highly polar portion. Alternatively, one or more surfactants may be used in conjunction with polymer (I), whether in the presence or the absence of the C or E, or both, moieties. The surfactant(s) may be anionic, cationic, nonionic, or zwitterionic.

The primer core/shell polymers incorporate the following moieties:

$$[(A)_m(B)_n(C)_p(E)_r]_y \qquad (II)$$

wherein A, B, C, and E are as described above and where m, n, p, and r are as follows:

m=0 to 90 wt %;
n=0 to 90 wt %;
p=0 to 90 wt %;
r=0.01 to 100 wt %;
m+n+p+r=100 wt %; and
y=1 to 100,000.

In polymer (II), both the C and E moieties are water-soluble, and the C moiety is neutral, while the E moiety is either charged or polar.

The molecular weight (weight average) of polymer (II) is between about 100 and 2,000,000.

The inks of the invention comprise about 5 to 50 wt % solvent, about 0.5 to 10 wt % colorant, about 0.005 to 50 wt % durable core/shell polymer, about 0.005 to 50 wt % primer core/shell polymer, and the balance water.

The dual encapsulation of the colorant with first the primer core/shell polymer (II) and then the durable core/shell polymer (I), when combined with an aqueous-based ink, provides (1) improved adhesion of the core/shell polymer to the colorant, (2) high dispersion in water, and (3) durable films of ink on print media that are substantially smear-resistant.

Any of the foregoing A, B, C, D, and E moieties may be provided by one or more monomers. Alternatively, any one of the foregoing functionalities may be provided by more than one monomer.

In all instances, the A moiety having the low $T_g$ confers a film-forming capability to the polymer. The film, after drying, is not capable of being reconstituted by water.

The polymers of the invention are prepared by emulsifying the monomers and then conducting a free-radical polymerization in water, although bulk polymerization in a solvent can be used instead for forming the primer core/shell polymer.

In the use of core/shell polymers to enhance water-dispersibility as well as physical properties of water-dispersive species (pigments, dyes, magnetic powders, etc.), in the ink-jet ink (thermal ink-jet or piezo ink-jet), there is an issue of poor printability associated with missing nozzles (i.e., clogged nozzles) which cause streak lines and unstable jet phenomena, including decel, as well as kogation, etc. Suitable pH adjustment can show some improvement, but it is not always an absolute solution for good pen reliability.

The present invention provides an absolute solution for improved performance of a core/shell polymer integrated ink by adding another polymer besides the durable core/shell polymer already existing in the ink. Thus, the second polymer is called an additive, or primer, polymer. The mechanism of improved pen performance by adding such polymeric additives is not well understood. However, the improvement can be achieved in several different ways of integrating the polymeric additives into the ink, described as follows:

(a) The second polymer (or polymer additive) can be deposited directly on the colorant (pigment, dye, magnetic powder, etc.) and generates a thin coating where the durable core/shell polymer can adhere to and thus it increases the physical attachment of the durable core/shell polymer to the colorant surface. This type of second polymer is described above in the discussion concerning primer core/shell polymers.

Such a thin film coating can be done by direct milling of solid colorants with the additive polymer in the presence of a wet phase, including water, organic solvents, or other suitable media. The milling process is carried out by some mechanical shear energy with or without the aid of milling media, such as zirconia balls. The milling apparatus which can provide suitable mechanical shear energy include any of the conventional grinding equipment, including paint shakers, ball mills, sweeco mills, attritors, sand mills, small media mills, homogenizers, microfludizers, etc. The suitable milling media include conventional materials having a particle size ranging from about 500 μm to 10 cm in diameter, including table salt, glass beads, ceramic beads, plastic beads, stainless steel beads, and the like.

The thin film coating of additive polymer can also be obtained by a hot stir process of colorants in a mixture of polymeric additives and suitable solvents. For example, the ink mixture containing colorants, solvents and polymeric additives can be refluxed at the boiling point of water and/or solvent for several hours, followed by cooling to room temperature (≈25° C.). The reflux temperature must be above the glass transition temperature ($T_g$) of the polymeric additives and the refluxing time is within the range of several tens of minutes to several tens of hours. In this case, the polymeric additives behave like a primer coating in the paint technology, and is so termed herein.

(b) In other cases, the additive polymer or second polymer can be added randomly into the ink without extra effort to enforce the polymeric additives remaining on the surface of the colorants rather than just existing in the ink liquid. The additive polymer is considered simply to be associated with the colorant. The reaching of additive polymer to the colorant surface is rather an equilibrium of all components of the ink at the last stage of ink finishing.

In any case, the second polymer, whether as a primer polymer or associated additive polymer, is carefully selected from a water-soluble copolymer or a water-dispersible copolymer having the general structure defined in (II) above.

Further, in considering the second polymer, whether a primer polymer or associated additive polymer, in combination with the colorant (pigment, dye, magnetic powder, etc.), it will be appreciated that after printing or painting or coating, the colorant is eventually seen to include two different polymers (durable core/shell polymer and primer or associated additive core/shell polymer), and the system is thus termed "dual encapsulation". For convenience, the second, adhesive polymer is termed herein a "primer core/shell polymer" whether it is being used to coat the colorant or simply be in associated with the colorant.

BEST MODES FOR CARRYING OUT THE INVENTION

Definitions

Figure 1A:
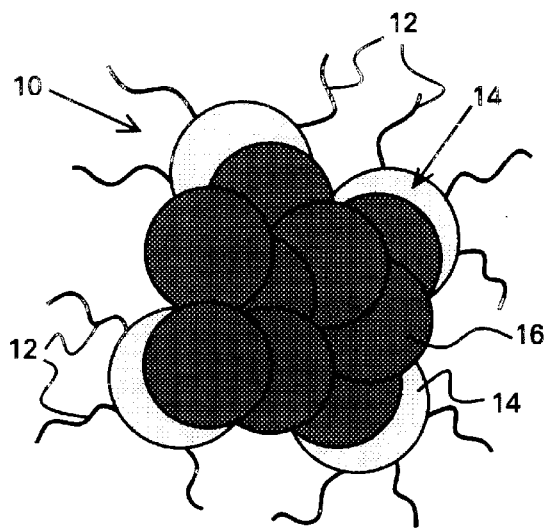
FIG. 1a is a schematic diagram depicting a core/shell polymer coated colorant (e.g., a pigment) in accordance with the present invention in water.

The following definitions are made:

The term "core/shell polymer" means a water-dispersive polymer comprised of a solid hydrophobic core surrounded by (either physically or chemically) a water-soluble shell component.

The term "substituted" is meant to include alcohols (OH), esters (COOR), aldehydes (CHO), carboxylic acids (COOH), thiols (SH), amino groups ($NH_2$, $NHR_1NR_2$) nitro group ($NO_2$), nitrites (CN), isocyanides (NC), cyanates (CNO), isocyanates (NCO), amido groups, epoxies, halogens, siloxanes, and pyrridinyls. The term "halogen" is meant to include fluorine, chlorine, bromine, and iodine.

All concentrations are given in terms of weight percent (wt %), unless otherwise specified. All values of molecular weight of polymers are given in terms of weight average.

Smear-fast Core/Shell Polymers
Monomeric Moieties

The smear-fast, or durable, core-shell polymers, that is, polymers having a hydrophilic portion and a hydrophobic portion, have the following general structure given by formula (I)

$$[(A)_m(B)_n(C)_p(D)_q(E)_r]_x \quad (I)$$

wherein A, B, C, D, and E are monomers as follows:

A=at least one hydrophobic component contributing to improved durable, film-forming properties selected from moieties which, when homopolymerized to a solid state, have a glass transition temperature ($T_g$) in the range between −100° and +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 90 wt %, preferably 10 to 60 wt %, and more preferably 15 to 50 wt %;

n=10 to 90 wt %, preferably 10 to 60 wt %, and more preferably 15 to 50 wt %;

p=0 to 60 wt %, preferably 10 to 50 wt %, and more preferably 10 to 30 wt %;

q=0 to 50 wt %, preferably 0 to 40 wt %, and more preferably 0.5 to 10 wt %;

r=0 to 30 wt %, preferably 0 to 20 wt %, and more preferably 0 to 10 wt %;

m+n+p+q+r=100 wt %; and x=1 to 100,000, preferably 10 to 10,000, and more preferably 100 to 1,000. Preferably, the final $T_g$ of the polymer(s) (I) is within the range of about −10° to +110° C., and more preferably, the final $T_g$ is within the range of about 0° to +90° C., and most preferably within the range of about 0° to +75° C.

The molecular weight (weight average) of polymer (I) is between about 100 and 2,000,000, preferably between about 5,000 and 500,000, and most preferably between about 10,000 and 70,000.

The polymer (I) of the present system is designed to have either hydrophobic and hydrophilic moieties or have only hydrophobic moieties and be associated with one or more surfactants to form a polymer/surfactant system. Thus, the polymer or polymer/surfactant system is both (1) water-dispersible, and includes water-soluble polar groups, which are present in sufficient quantity to suspend a pigment particle, and (2) hydrophobic, with a substantial fraction of the polymer containing hydrophobic moieties that are either highly water-resistant or even water-insoluble.

The hydrophobic A moiety allows the polymer (I) to have a sufficiently low $T_g$ to permit formation of a film with other polymer molecules containing the A moiety. The film formation results upon drying (removal of water).

The hydrophobic B moiety in combination with the hydrophobic A moiety provide the polymer with resistance to environmental solvents, such as water and those found in highlighter pens. Additional environmental solvents can be found in rain, coffee, soda pop, body oils, soils, hot water, etc.

The hydrophilic C moiety may be provided in the polymer itself, as shown in formula (I). At least one C moiety may be present, and is water-soluble. If present, such water-soluble moieties comprise an ionic or non-ionic shell of the core-shell polymer. Alternatively, the C moiety may be provided by one or more surfactants, to form a polymer/surfactant system. Any of the ionic (anionic and cationic), non-ionic, and zwitterionic (amphoteric) surfactants may be employed. Examples of surfactants that may be beneficially employed in the practice of the present invention include: TERGITOLs, which are polyethylene or polypropylene oxide ethers; TRITONs, which are alkyl phenyl polyethylene oxides available from Rohm & Haas Co.; BRIJs, which are polyethylene or polypropylene oxide ethers; PLURONICs, which are also polyethylene or polypropylene oxide ethers; and the SURFYNOLs, which are acetylenic ethylene oxides; polyethylene oxide (POE) esters; POE diesters; POE amines; protonated POE amines; POE amides; the polypropylene analogs of the foregoing POE compounds; dimethicone copolyols; quaternary ammonium compounds; aerosols (sulfosuccinates); ethoxylates, amine oxides, and betaines. Preferred examples of non-ionic surfactants include, but are not limited to, BRIJs, which are polyethylene or polypropylene oxide ethers, available from Aldrich Chemical (specific examples include the following BRIJs: 30, 35, 52, 56, 58, 72, 76, 78, 92, 97, and 98); TWEENs, which are derivatives of polyethylene oxides, available from Aldrich Chemical (specific examples include the following TWEENs: 20, 40, 60, 80, and 85); SOL-SPERSE 27,000, which is an aromatic ethoxylate, available from Zeneca; SPAN 85, which is available from Air Products; and SURFYNOLs, which are acetylenic ethylene oxides available from Air Products. Examples of anionic surfactants include AEROSOL DPOS 45, which is a sulfonate, available from Cytec Industries; sodium octadecyl sulfonate; AEROSOL OT 100%, which is a sulfonate, available from American Cyanamid; sodium styrene sulfonate; sodium xylene sulfonate; and sodium lauryl sulfonate. If used, the amount of surfactant ranges from about 0.001 to 30 wt %, and the balance the polymer.

Optionally, one or more UV absorber moieties D may be present. The UV absorber contains a UV blocking chromophore, which imparts lightfastness to the polymer (I).

Also optionally, one or more ionic water-soluble moieties E may be present. If present, such water-soluble moieties comprise an ionic shell of the core-shell polymer.

One monomer may be employed to provide one or more of the foregoing functions. Alternatively, one function may be provided by one or more of the foregoing moieties. However, in many instances, a single monomer provides a single function.

The polymer(s) of the present invention is prepared by emulsifying the monomeric components, and then conducting a free-radical polymerization in water. Free-radical polymerization involves employing a free-radical initiator. A concentration of about 0.001 to 10 wt % of the initiator is employed in the total monomer system. Examples of suitable free-radical initiators include, but are not limited to, ammonium persulfate, potassium persulfate, hydrogen peroxide, benzoyl peroxide, azobisisobutyronitrile, TRIGONOX 21, and PERKADOX 16. Preferably, the resulting polymer (I) is a random polymer.

One skilled in this art would understand that the polymer(s) can also be prepared by conventional condensation techniques. Once a film is formed from the polymer and water is removed, as by dehydration under ambient conditions, the film is essentially impervious to water, and the polymer is not capable of being redispersed with water. If the polymer or polymer/surfactant system is associated with pigment particles, and the pigment with polymer or polymer/surfactant system is deposited on a surface, such as paper, then the pigment particles are trapped within or beneath the film on the surface, and are thus protected from the effects of water and environmental solvents.

As stated above, the A moiety is a hydrophobic component for controlling solubility in organic solvents selected from monomer(s) that form homopolymers having a T. in the range between –100° and 25° C. The A moiety is preferably selected from ethylenically-substituted compounds given by (A):

$$CR_1R_2=C(R_3)R_4R_5R_6 \quad (A)$$

where

R$_1$ and R$_2$ are independently hydrogen, halogen, alkyl, aryl, or substituted alkyl or aryl, or vinyl butyral, R$_3$ is hydrogen, halogen, alkyl, alkoxy, alkylene, aryl, or substituted alkyl, alkoxy, alkylene, or aryl, R$_4$ is direct bond, O, CO, N, halogen, alkyl, alkylene, aryl, or substituted alkyl, alkylene, aryl, or CN, R$_5$ is hydrogen, N, O, alkyl, alkylene, aryl, or substituted alkyl, alkylene, or aryl, and R$_6$ is N, alkyl, alkoxy, alkylene, aryl, aroxy, or substituted alkyl, alkylene, or aryl. The alkyl, alkoxy, alkylene, and aryl chains each contain more than one carbon atom and less than 40 carbon atoms. Preferably, the R$_4$ functionality is an electron acceptor moiety.

One preferred embodiment of formula (A) is the following general structure (A1):

where

R'$_3$=H, halogen, alkyl, aryl or substituted alkyl or aryl;

R'$_5$=direct bond, O, or NH; and

R'$_6$=alkyl, substituted alkyl, alkylaryl or substituted alkylaryl and aralkyl in which the length of alkyl, alkylaryl or aralkyl chain is given as the number of C atoms between 2 and 40; and alkyl or aryl siloxanes.

Examples for structure (A1) include, but are not limited to:

(A1-1) ethyl acrylate;

(A1-2) ethyl methacrylate;

(A1-3) ethyl butacrylate;

(A1-4) benzyl acrylate;

(A1-5) benzyl methacrylate;

(A1-6) propyl acrylate;
(A1-7) propyl methacrylate;
(A1-8) iso-propyl acrylate;
(A1-9) iso-propyl methacrylate;
(A1-10) butyl acrylate;
(A1-11) butyl methacrylate;
(A1-12) hexyl acrylate;
(A1-13) hexyl methacrylate;
(A1-14) octadecyl methacrylate;
(A1-15) octadecyl acrylate;
(A1-16) lauryl methacrylate;
(A1-17) lauryl acrylate;
(A1-18) hydroxyethyl acrylate;
(A1-19) hydroxyethyl methacrylate;
(A1-20) hydroxyhexyl acrylate;
(A1-21) hydroxyhexyl methacrylate;
(A1-22) hydroxyoctadecyl acrylate;
(A1-23) hydroxyoctadecyl methacrylate;
(A1-24) hydroxylauryl methacrylate;
(A1-25) hydroxylauryl acrylate;
(A1-26) phenethyl acrylate;
(A1-27) phenethyl methacrylate;
(A1-28) 6-phenylhexyl acrylate;
(A1-29) 6-phenylhexyl methacrylate;
(A1-30) phenyllauryl acrylate;
(A1-31) phenyllauryl methacrylate;
(A1-32) 3-nitrophenyl-6-hexyl methacrylate;
(A1-33) 3-nitrophenyl-18-octadecyl acrylate;
(A1-34) ethyleneglycol dicyclopentyl ether acrylate;
(A1-35) vinyl ethyl ketone;
(A1-36) vinyl propyl ketone;
(A1-37) vinyl hexyl ketone;
(A1-38) vinyl octyl ketone;
(A1-39) vinyl butyl ketone;
(A1-40) cyclohexyl acrylate;
(A1-41) 3-methacryloxypropyldimethylmethoxysilane;
(A1-42) 3-methacryloxypropylmethyldimethoxysilane;
(A1-43) 3-methacryloxypropylpentamethyldisiloxane;
(A1-44) 3-methacryloxypropyltris(trimethylsiiloxy) silane;
(A1-45) 3-acryloxypropyldimethylmethoxysilane;
(A1-46) acryloxypropylmethyldimethoxysilane;
(A1-47) trifluoromethyl styrene;
(A1-48) trifluoromethyl acrylate;
(A1-49) trifluoromethyl methacrylate;
(A1-50) tetrafluoropropyl acrylate;
(A1-51) tetrafluoropropyl methacrylate; and
(A1-52) heptafluorobutyl methacrylate.

Another preferred embodiment for formula (A) is the following general structure (A2):

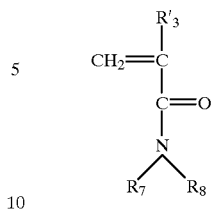

(A2)

where
$R'_3$=same definition as that of structure (A1) above; and
$R_7=R_8$=same or different combinations of $R'_6$ in structure (A1) above.

An example for structure (A2) includes, but is not limited to:

(A2-1) N,N-dihexyl acrylamide; and
(A2-2) N,N-dioctyl acrylamide.

Yet another preferred embodiment for formula (A) is the following general structure (A3):

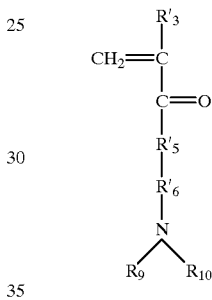

(A3)

where
$R'_3$=same definition as that of structure (A1);
$R'_5$=same definition as that of structure (A1);
$R'_6$=alkylene, arylene, substituted alkylene or arylene; and
$R_9$ and $R_{10}$ are independently selected from H, alkyl, substituted alkyl, alkylaryl or substituted alkylaryl in which the length of alkyl and alkylaryl chains each comprise between 2 and 40 C atoms. Alternatively, Rg and RIO together may form a 5- or 6-membered ring.

Examples for structure (A3) include, but are not limited to:

(A3-1) aminoethyl butacrylate;
(A3-2) aminopropyl acrylate;
(A3-3) aminopropyl methacrylate;
(A3-4) aminoisopropyl acrylate;
(A3-5) aminoisopropyl methacrylate;
(A3-6) aminobutyl acrylate;
(A3-7) aminobutyl methacrylate;
(A3-8) aminohexyl acrylate;
(A3-9) aminohexyl methacrylate;
(A3-10) aminooctadecyl methacrylate;
(A3-11) aminooctadecyl acrylate;
(A3-12) aminolauryl methacrylate;
(A3-13) aminolauryl acrylate;
(A3-14) N,N-dimethylaminoethyl acrylate;
(A3-15) N,N-dimethylaminoethyl methacrylate;
(A3-16) N,N-diethylaminoethyl acrylate;

(A3-17) N,N-diethylaminoethyl methacrylate; and (A3-18) piperidino-N-ethyl acrylate.

Still another preferred embodiment for formula (A) is the following general structure (A4):

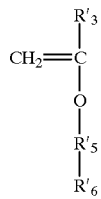
(A4)

where:

R'$_4$=H, halogen, alkyl, aryl, substituted alkyl or aryl;

R'$_5$=direct bond, CO, alkylene, arylene, substituted alkylene or arylene; and

R'$_6$=alkyl, aryl, substituted alkyl or aryl.

Examples for structure (A4) include, but are not limited to:

(A4-1) vinyl propionate;

(A4-2) vinyl acetate;

(A4-3) vinyl butyrate;

(A4-4) vinyl butyl ether; and (A4-4) vinyl propyl ether.

As stated above, the B moiety is hydrophobic and is a solvent barrier composed of monomer(s) that form homopolymers having a $T_g$ greater than 25° C. The B moiety has the general structure given by formula (B)

$$CR_1R_2=C(R_3)R''_4R_5R''_6 \quad (B)$$

where

R$_1$ and R$_2$ are independently hydrogen, halogen, or vinyl butyral,

R$_3$ is hydrogen, halogen, alkyl, alkoxy, alkylene, aryl, or substituted alkyl, alkoxy, alkylene, or aryl, R''$_4$ is direct bond, O, CO, N, NO$_2$, halogen, alkyl, alkylene, aryl, or substituted alkyl, alkylene, aryl, R$_5$ is hydrogen, N, O, alkyl alkylene, aryl, or substituted alkyl, alkylene, or aryl, and R''$_6$ is alkyl alkoxy, alkylene, aryl, aroxy, or substituted alkyl, alkylene, or aryl. The alkyl, alkoxy, alkylene, aryl, aroxy chains each contain from 1 to 40 carbon atoms. Additionally, R$_1$ and R$_2$ and R$_2$ and R$_3$ can each form a ring; one example of a ring compound so formed includes, but is not limited to, polyvinyl butyral. Further, R''$_4$ and R$_5$ can form a ring through either nitrogen or oxygen.

Formula (B) is seen to be substantially the same as formula (A), but with some differences in the substituent groups, which provide a homopolymer of these monomers with the higher $T_g$ of at least 25° C.

One preferred embodiment of formula (B) is the following general structure (B 1):

$$CH_2=CR'''_5R'''_6 \quad (B1)$$

where

R'''$_5$=hydrogen, alkyl, alkoxy, aryl or halogen; and

R'''$_6$=H, aryl, alkyl (with one carbon atom), amino, ester, epoxy component containing groups, and fluoroalkyl derivatives.

Examples for formula (B1) include, but are not limited to;

(B1-1) ethylene;

(B1-2) styrene;

(B1-3) vinyl carbazole;

(B1-4) vinyl naphthalene;

(B1-5) vinyl anthracene;

(B1-6) vinyl pyrene;

(B1-7) methyl methacrylate;

(B1-8) methyl acrylate;

(B1-9) alpha-methyl styrene;

(B1-10) dimethylstyrene;

(B1-11) methylstyrene;

(B1-12) vinylbiphenyl;

(B1-13) glycidyl acrylate;

(B1-14) glycidyl methacrylate;

(B1-15) glycidyl propylene;

(B1-16) 2-methyl-2-vinyl oxirane;

(B1-17) vinyl pyridine; and (B1-18) aminoethyl acrylate;

(B1-19) aminoethyl methacrylate; and (B1-20) aminoethylphenyl acrylate.

Another preferred embodiment of formula (B) is the following general structure (B2):

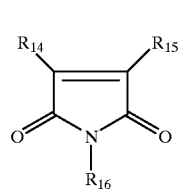
(B2)

where

R$_{14}$ and R$_{15}$ are independently selected from H, halogen, alkyl, aryl, substituted alkyl and aryl; alternatively, R$_{14}$ and R$_{15}$ are in the form of a closed ring; and R$_{16}$ is H, halogen, alkyl, aryl, substituted alkyl or aryl, or unsaturated alkyl.

Examples for formula (B2) include, but are not limited to:

(B2-1) maleimide;

(B2-2) N-phenyl maleimide;

(B2-3) N-hexyl maleimide;

(B2-4) N-vinylphthalimide; and (B2-5) N-vinyl maleimide.

As stated above, the C moiety is an optional hydrophilic component. The C moiety is selected from a wide variety of monomers such as poly(ethylene glycol) units having general formula (C1), vinyl pyrrolidones having general formula (C2), vinyl imidazoles having general formula (C3) and acrylamides having general formula (C4), all of which polymerize to form water-soluble polymers.

The general structure of formula (C1) is

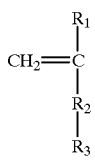
(C1)

where $R_1$=H, halogen, alkyl, aryl, or substituted alkyl or aryl;
$R_2$=direct bond, O, CO, NH, or CONH;
$R_3$=OH, $(CH_2CH_2O)_yR_4$, or $(CH_2CH(CH_3)O)_yR_4$.
y=1 to 200; and
$R_4$=alkyl, aryl, substituted alkyl or aryl.

Examples for general structure (C1) include, but are not limited to:
(C1-1) poly(ethylene glycol) methyl ether acrylate of average molecular weight 404;
(C1-2) poly(ethylene glycol) methyl ether methacrylate of average molecular weight 418;
(C1-3) poly(ethylene glycol) methyl ether methacrylate of average molecular weight 2068;
(C1-4) poly(ethylene glycol) methyl ether acrylate of average molecular weight 2054; and
(C 1-5) polyvinyl alcohol.

The general structure of formula (C2) is

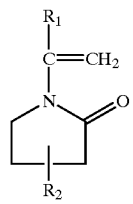
(C2)

where $R_1$ and $R_2$ are independently selected from —H, halogen, alkyl aryl, and substituted alkyl and aryl.

Examples for general structure (C2) include, but are not limited to:
(C2-1) vinyl pyrrolidone;
(C2-2) vinyl 4-methylpyrrolidone; and
(C2-3) vinyl 4-phenylpyrrolidone.

The general structure of formula (C3) is

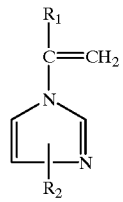
(C3)

where $R_1$ and $R_2$ are independently selected from H, halogen, alkyl, aryl, and substituted alkyl and aryl.

Examples for general structure (C3) include, but are not limited to:

(C3-1) vinyl imidazole;
(C3-2) vinyl 4-methylimidazole; and
(C3-3) vinyl 4-phenylimidazole.

The general structure of formula (C4) is

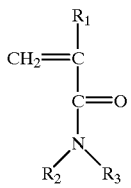
(C4)

where $R_1$ is H, halogen, alkyl, aryl or substituted alkyl or aryl; and $R_2$ and $R_3$ are independently selected from H, alkyl, aryl and substituted alkyl and aryl; alternatively, $R_2$ and $R_3$ can form a ring, either aliphatic or aromatic.

Examples for the general structure (C4) include, but are not limited to:
(C4-1) acrylamide;
(C4-2) methacrylamide;
(C4-3) N,N-dimethyl acrylamide;
(C4-4) N-methyl acrylamide;
(C4-5) N-methyl methacrylamide;
(C4-6) aryloxy piperidine; and
(C4-7) N,N-diethyl acrylamide.

As stated above, the D moiety is a UV absorber composed of monomer(s) having the general structure of formula (D)

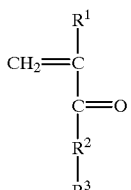
(11)

$R^1$ = H, Alkyl, aryl, substituted alkyl or aryl
$R^2$ = O or NH $R^3$ = 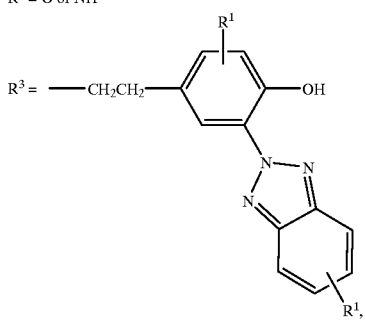

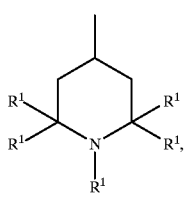

-continued

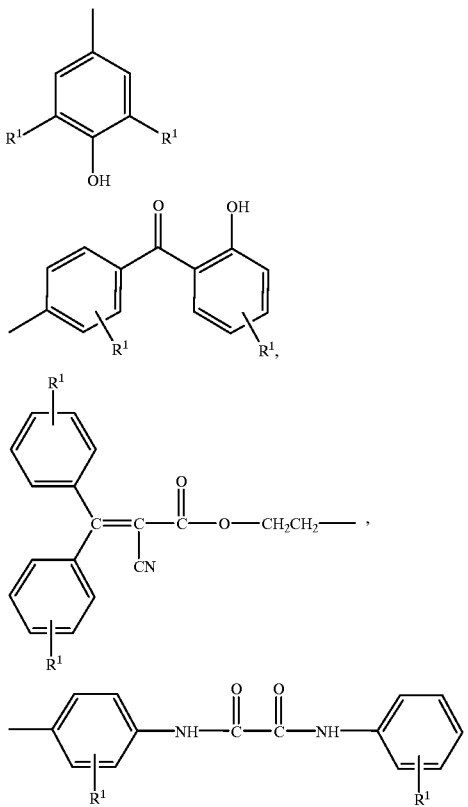

As stated above, the E moiety is a highly polar functional group composed of moieties having the general structure given by formulae (E1) to (E10).

The general structure of formula (E1) is

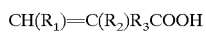
CH(R₁)=C(R₂)R₃COOH    (E1)

where
R$_1$=H, COOH, COOR$_4$;
R$_2$=H, halogen, alkyl, aryl, alkoxyl, or substituted alkyl, aryl or alkoxyl;
R$_3$=direct bond, alkylene, arylene or substituted alkylene or arylene; and
R$_4$=alkyl, aryl, substituted alkyl or aryl.

Examples for structure (E1) include, but are not limited to:
(E1-1) acrylic acid;
(E1-2) methacrylic acid;
(E1-3) chloromethacrylic acid; and
(E-4) maleic acid.

The general structure of formula (E2) is

CH₂=CHR₁NR₂R₃    (E2)

where
R$_1$=alkylene, arylene, substituted alkylene, arylene, or —SO$_2$; and
R$_2$ and R$_3$ are independently selected from H, alkyl, aryl, or substituted alkyl, aryl or alkoxyl; alternatively, R$_2$ and R$_3$ can be combined to form a ring, either aliphatic or aromatic.

Examples for structure (E2) include, but are not limited to:
(E2-1) allylamine;
(E2-2) N,N-diethylallylamine; and
(E2-3) vinyl sulfonamide.

The general structure of formula (E3) is

y(CH₂=CHR₁COO⁻)M^{y+}+tm    (E3)

where R$_1$=alkylene, arylene, substituted alkylene or arylene;
y=1 to 4; and
M$^{y+}$=NH$_4^-$, Li$^+$, Na$^+$, K$^+$, Ca$^{2+}$, Mg$^{2+}$, Al$^{3+}$, Ti$^{4+}$, triethylammonium, diethylammonium, pyrridinium, etc.

Examples for structure (E3) include, but are not limited to:
(E3-1) sodium acrylate;
(E3-2) sodium methacrylate;
(E3-3) ammonium acrylate; and
(E3-4) ammonium methacrylate.

The general structure of formula (E4) is

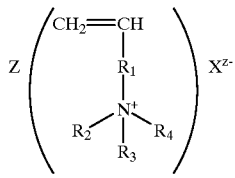

where
R$_1$=alkylene, arylene, substituted alkylene or arylene, COO, or cyclic ring containing nitrogen;
R$_2$, R$_3$, and R$_4$ are independently selected from H, alkyl, aryl, alkoxyl, or substituted alkyl, aryl or alkoxyl;
z=1 to 4; and
X=halogen, BF$_4$, PF$_6$, ClO$_4$, SCN, CNO, CNS.

Examples for general structure (E4) include, but are not limited to:
(E4-1) acrylamidopropanetriethylammonium chloride;
(E4-2) methacrylamidopropanetriethylammonium chloride; and
(E4-3) vinylpyridine hydrochloride.

The general structure of formula (E5) is

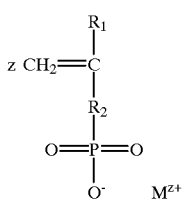

where
R$_1$=H, alkyl, aryl, alkoxyl, substituted alkyl, aryl or alkoxyl;
R$_2$=direct bond, alkylene, arylene or substituted alkylene or arylene;
z=1 to 4; and
M$^{z+}$=NH$_4^+$, Li$^+$, Na$^+$, K$^+$, Ca$^{2+}$, Mg$^{2+}$, Al$^{3+}$, Ti$^{4+}$, triethylammonium, diethylammonium, pyrridinium, etc.

Examples for the general structure (E5) include, but are not limited to:

(E5-1) sodium vinyl phosphonate; and
(E5-2) sodium 1-methylvinylphosphonate.

The general structure of formula (E6) is

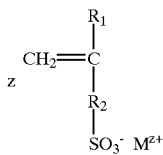

(E6)

where $R_1$=H, alkyl, aryl, alkoxyl, substituted alkyl, aryl or alkoxyl;

$R_2$=direct bond, —$COOR_3$, arylene, alkylene, or —$CONHR_3$;

$R_3$=alkylene, arylene, substituted alkylene or arylene, or fluoroalkylene;

z=1 to 4; and $M^{z+}$=$NH_{4+}$, $Li^+$, $Na^+$, $K^+$, $Ca^{2+}$, $Mg^{2+}$, $Al^{3+}$, $Ti^{4+}$, etc.

Examples for the general structure (E6) include, but are not limited to:

(E6-1) sodium vinyl sulfonate;
(E6-2) sodium 1-methylvinylsulfonate;
(E6-3) sodium styrenesulfonate;
(E6-4) sodium acrylamidopropanesulfonate;
(E6-5) sodium methacrylamidopropanesulfonate; and
(E6-6) sodium vinyl morpholine sulfonate.

Additional E moieties include the following salts:

(E7) sulfonium salts;
(E8) carbonium salts;
(E9) pyrrilinium salt and thio pyrrilinium salt; and
(E10) tetrazolium salt.

The sulfonium salts have the following structure (E7):

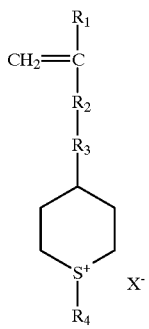

(E7)

where $R_1$=H, halogen, alkyl, or aryl;
$R_2$=CO, O;
$R_3$=direct bond, NH;
$R_4$=alkyl or aryl; and
X=Cl, Br, $BF_4$, $ClO_4$, I, or $NO_3$.

The carbonium salts have the following structure (E8):

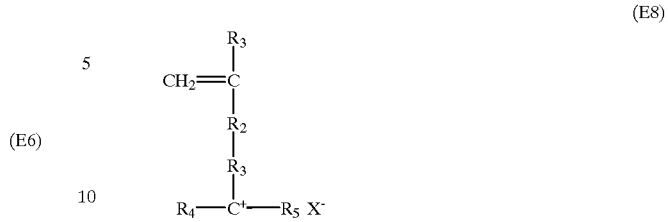

(E8)

where $R_1$=H, halogen, alkyl, or aryl;
$R_2$=CO, O;
$R_3$=direct bond, NH, alkylene, or arylene;
$R_4$ and $R_5$ are independently selected from alkyl or aryl; and
X=$SbF_5FSO_3$.

The pyrrilinium and thio-pyrrilinium salts have the following structure (E9):

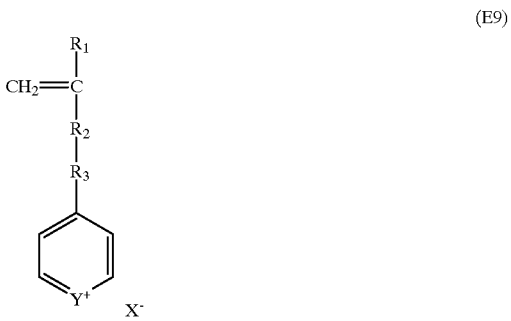

(E9)

where

Y=O or S;
$R_1$=H, halogen, alkyl, or aryl;
$R_2$=CO, O;
$R_3$=direct bond, NH, alkylene, or arylene;
X=Cl, Br, I, $ClO_4$, $BF_4$, etc.

Polymers

Polymers that fall within the scope of the formula (I) include, but are not limited to, the following examples, which may be characterized as A-B-C or A-B-C-D polymers; these polymers evidence excellent smear-fastness and durable film-forming properties upon drying of inks containing them:

S1. (hexyl acrylate)$_{40}$ (methyl methacrylate)$_{40}$ (poly (ethylene glycol) methyl ether acrylate, mw=404)$_{20}$ S2. (hexyl acrylate)$_{30}$ (methyl methacrylate)$_{50}$ (poly (ethylene glycol) methyl ether acrylate, mw=404)$_{20}$ S3. (hexyl acrylate)$_{20}$ (methyl methacrylate)$_{60}$ (poly (ethylene glycol) methyl ether acrylate, mw=404)$_{20}$ S4. (hexyl acrylate)$_{40}$ (methyl methacrylate)$_{40}$ (poly (ethylene glycol) methyl ether acrylate, mw=2054)$_{20}$ S5. (hexyl acrylate)$_{30}$ (methyl methacrylate)$_{50}$ (poly (ethylene glycol) methyl ether acrylate, mw=2054)$_{20}$ S6. (hexyl acrylate)$_{20}$ (methyl methacrylate)$_{60}$ (poly (ethylene glycol) methyl ether acrylate, mw=2054)$_{20}$ S7. (hexyl acrylate)$_{40}$ (methyl methacrylate)$_{40}$ (poly (ethylene glycol) methyl ether acrylate, mw=218)$_{20}$ S8. (hexyl acrylate)$_{30}$ (methyl methacrylate)$_{50}$ (poly (ethylene glycol) methyl ether acrylate, mw=218)$_{20}$ S9. (hexyl acrylate)$_{20}$ (methyl methacrylate)$_{60}$ (poly(ethylene glycol) methyl ether acrylate, mw=218)$_{20}$ S10. (ethyl acrylate)$_{40}$ (methyl methacrylate)$_{40}$ (poly(ethylene glycol) methyl ether acrylate, mw=404)$_{20}$ S11. (propyl acrylate)$_{40}$ (methyl methacrylate)$_{40}$ (poly(ethylene glycol) methyl ether acrylate, mw=404)$_{20}$ S12. (butyl acrylate)$_{40}$ (methyl methacrylate)$_{40}$ (poly(ethylene glycol) methyl ether acrylate, mw=404)$_{20}$ S13. (octadecyl acrylate)$_{40}$ (methyl methacrylate)$_{40}$ (poly(ethylene glycol) methyl ether acrylate, mw=404)$_{20}$ S14. (lauryl methacrylate)$_{40}$ (methyl methacrylate)$_{40}$ (poly(ethylene glycol) methyl ether acrylate, mw=404)$_{20}$ S15. (octadecyl methacrylate)$_{40}$ (methyl methacrylate)$_{40}$ (poly(ethylene glycol) methyl ether acrylate, mw=404)$_{20}$ S16. (hydroxyoctadecyl acrylate)$_{40}$ (methyl methacrylate)$_{40}$ (poly(ethylene glycol) methyl ether acrylate, mw=404)$_{20}$ S17. (hydroxyethyl acrylate)$_{40}$ (methyl methacrylate)$_{40}$ (poly(ethylene glycol) methyl ether acrylate, mw=404)$_{20}$ S18. (hydroxylauryl methacrylate)$_{40}$ (methyl methacrylate)$_{40}$ (poly(ethylene glycol) methyl ether acrylate, mw=404)$_{20}$ S19. (phenethyl acrylate)$_{40}$ (methyl methacrylate)$_{40}$ (poly(ethylene glycol) methyl ether acrylate, mw=404)$_{20}$ S20. (6-phenylhexyl acrylate)$_{40}$ (methyl methacrylate)$_{40}$ (poly(ethylene glycol) methyl ether acrylate, mw=404)$_{20}$ S21. (cyclohexyl acrylate)$_{40}$ (methyl methacrylate)$_{40}$ (poly(ethylene glycol) methyl ether acrylate, mw=404)$_{20}$ S22. (acryloxypropylmethyldimethoxysilane)$_{30}$ (methyl methacrylate)$_{50}$ poly(ethylene glycol) methyl ether acrylate, mw=404)$_{20}$ S23. (N,N-dihexyl acrylamide)$_{20}$ (methyl methacrylate)$_{60}$ (poly(ethylene glycol) methyl ether acrylate, mw=404)$_{20}$ S24. (aminopropyl acrylate)$_{40}$ (methyl methacrylate)$_{40}$ (poly(ethylene glycol) methyl ether acrylate, mw=2054)$_{20}$ S25. (aminohexyl acrylate)$_{30}$ (methyl methacrylate)$_{50}$ (poly(ethylene glycol) methyl ether acrylate, mw=2054)$_{20}$ S26. (aminolauryl methacrylate)$_{20}$ (methyl methacrylate)$_{60}$ (poly(ethylene glycol) methyl ether acrylate, mw=2054)$_{20}$ S27. (N,N-dimethylaminoethyl acrylate)$_{40}$ (methyl methacrylate)$_{40}$ (poly(ethylene glycol) methyl ether acrylate, mw=218)$_{20}$ S28. (vinyl acetate)$_{30}$ (methyl methacrylate)$_{50}$ (poly(ethylene glycol) methyl ether acrylate, mw=218)$_{20}$ S29. (vinyl butyl ether)$_{20}$ (methyl methacrylate)$_{60}$ (poly(ethylene glycol) methyl ether acrylate, mw=218)$_{20}$ S30. (hexyl acrylate)$_{40}$ (styrene)$_{40}$ (poly(ethylene glycol) methyl ether acrylate, mw=404)$_{20}$ S31. (hexyl acrylate)$_{30}$ (dimethyl styrene)$_{50}$ (poly(ethylene glycol) methyl ether acrylate, mw=404)$_{20}$ S32. (hexyl acrylate)$_{20}$ (trifluoromethyl styrene)$_{60}$ (poly(ethylene glycol) methyl ether acrylate, mw=404)$_{20}$ S33. (hexyl acrylate)$_{40}$ (tetrafluoropropyl methacrylate)$_{40}$ (poly(ethylene glycol) methyl ether acrylate, mw=2054)$_{20}$ S34. (hexyl acrylate)$_{30}$ (glycidyl methacrylate)$_{50}$ (poly(ethylene glycol) methyl ether acrylate, mw=2054)$_{20}$ S35. (hexyl acrylate)$_{20}$ (glycidyl acrylate)$_{60}$ (poly(ethylene glycol) methyl ether acrylate, mw=2054)$_{20}$ S36. (hexyl acrylate)$_{40}$ (maleimide)$_{40}$ (poly(ethylene glycol) methyl ether acrylate, mw=218)$_{20}$ S37. (hexyl acrylate)$_{50}$ (n-hexyl maleimide)$_{30}$ (poly(ethylene glycol) methyl ether acrylate, mw=218)$_{20}$ S38. (hexyl acrylate)$_{40}$ (n-vinyl maleimide)$_{40}$ (poly(ethylene glycol) methyl ether acrylate, mw=218)$_{20}$ S39. (hexyl acrylate)$_{40}$ (methyl methacrylate)$_{40}$ (vinyl pyrrolidone)$_{20}$ S40. (hexyl acrylate)$_{40}$ (methyl methacrylate)$_{40}$ (vinyl 4-methylpyrrolidone)$_{20}$ S41. (hexyl acrylate)$_{40}$ (methyl methacrylate)$_{40}$ (vinyl imidazole)$_{20}$ S42. (hexyl acrylate)$_{40}$ (methyl methacrylate)$_{40}$ (acrylamide)$_{20}$ S43. (hexyl acrylate)$_{40}$ (methyl methacrylate)$_{40}$ (4-methyl acrylamide)$_{20}$ S44. (hexyl acrylate)$_{40}$ (methyl methacrylate)$_{30}$ (poly(ethylene glycol) methyl ether acrylate, mw=404)$_{20}$ (D1)$_{10}$ S45. (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$=D1

S46. (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$ =D1

S47. (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$ =D1

S48. (hexyl acrylate)$_{40}$ (methyl methacrylate)$_{30}$ (poly(ethylene glycol) methyl ether acrylate, mw=404)$_{20}$ (D4)$_{10}$, where, referring to the D moiety, $R^1$=H, $R^2$=O, and $R^3$ =D4

S49. (hexyl acrylate)$_{40}$ (methyl methacrylate)$_{30}$ (poly(ethylene glycol) ether acrylate, mw=404)$_{20}$ (D4)$_{10}$, where, referring to the D moiety, $R^1$=H, $R^2$=O, and $R^3$ D4

S50. (hexyl acrylate)$_{40}$ (styrene)$_{30}$ (poly(ethylene glycol) methyl ether acrylate, mw=404)$_{20}$(D1)$_{10}$, where, referring to the D moiety, $R^1$=H, $R^2$=O, and $R^3$=D1

S51. (hexyl acrylate)$_{40}$ (styrene)$_{30}$ (vinyl pyrrolidone)$_{20}$ (D1)$_{10}$, where, referring to the D moiety, $R^1$=H, $R^2$=O, and $R^3$=D1

S52. (hexyl acrylate)$_{50}$ (methyl methacrylate)$_{45}$ (poly(ethylene glycol) methyl ether acrylate, mw=404)$_5$ S53. (hexyl acrylate)$_{50}$ (methyl methacrylate)$_{40}$ (poly(ethylene glycol) methyl ether acrylate, mw=404)$_{10}$ S54. (hexyl acrylate)$_{50}$ (methyl methacrylate)$_{35}$ (poly(ethylene glycol) methyl ether acrylate, mw=404)$_{15}$ S55. (methyl methacrylate)$_{40}$ (hexyl acrylate)$_{60}$/surfactant S56. (methyl methacrylate)$_{40}$ (butyl acrylate)$_{60}$/surfactant S57. (styrene)$_{30}$ (octadecyl acrylate)$_{70}$/surfactant.

Primer Core/Shell Polymers
Monomers

The primer core/shell polymers also have a hydrophilic portion and a hydrophobic portion and have the following general structure given by formula (II)

$[(A)_m(B)_n(C)_p(E)_r]_y$ (II)

wherein A, B, C, and E are as described above and where m, n, and r are as follows:

m=0 to 90 wt %, preferably 10 to 60 wt %, and more preferably 15 to 50 wt %;

n0 to 90 wt %, preferably 10 to 60 wt %, and more preferably 15 to 50 wt %;

p=0 to 90 wt %, preferably 10 to 60 wt %, and more preferably 15 to 50 wt %;

r=0.01 to 100 wt %, preferably 0.01 to 60 wt %, and more preferably 1 to 40 wt %;

m+n+r=100 wt %; and y=1 to 100,000, preferably 10 to 10,000, and more preferably 100 to 1,000.

Preferably, either m or n is non-zero.

The molecular weight (weight average) of polymer (II) is between about 100 and 2,000,000, preferably between about 1,000 and 500,000, and most preferably between about 5,000 and 300,000.

The $T_g$ of the primer core/shell polymers is within the range of about −100° to +100° C., preferably within the range of about −25° to +25° C., and more preferably within the range of about 0° to +25° C., Polymers that fall within the scope of the formula (II) include, but are not limited to, the following examples, which may be characterized as A-B-E, A-B-C-E, A-E, or B-E polymers, or primer core/shell polymers; these polymers promote adhesion between the core/shell polymers above and pigments or dyes:

P1. (hexyl acrylate)$_{40}$ (methyl methacrylate)$_{40}$ (acrylic acid)$_{20}$

P2. (hexyl acrylate)$_{60}$ (methyl methacrylate)$_{20}$ (methacrylic acid)$_{20}$ P3. (hexyl acrylate)$_{40}$ (methyl methacrylate)$_{40}$ (maleic acid)$_{20}$ P4. (hexyl acrylate)$_{40}$ (methyl methacrylate)$_{40}$ (vinyl benzoic acid)$_{20}$ P5. (hexyl acrylate)$_{40}$ (methyl methacrylate)$_{40}$ (vinyl sulfonamide)$_{20}$ P6. (hexyl acrylate)$_{40}$ (methyl methacrylate)$_{40}$ (sodium acrylate)$_{20}$ P7. (hexyl acrylate)$_{40}$ (methyl methacrylate)$_{40}$ (ammonium acrylate)$_{20}$ P8. (hexyl acrylate)$_{40}$ (methyl methacrylate)$_{40}$ (ammonium methacrylate)$_{20}$ P9. (ethyl acrylate)$_{40}$ (methyl methacrylate)$_{40}$ (acrylamidopropanetriethylammonium chloride)$_{20}$ P10. (propyl acrylate)$_{40}$ (methyl methacrylate)$_{40}$ (vinyl pyridine hydrochloride)$_{20}$ P11. (butyl acrylate)$_{40}$ (methyl methacrylate)$_{40}$ (sodium vinyl phosphate)$_{20}$ P12. (hexyl acrylate)$_{40}$ (methyl methacrylate)$_{40}$ (sodium styrene sulfonate)$_{20}$ P13. (hexyl acrylate)$_{30}$ (methyl methacrylate)$_{50}$ (sodium acrylamidopropanesulfonate)$_{20}$ P14. (styrene)$_{10}$ (acrylic acid)$_{20}$ P15. (styrene)$_{60}$ (acrylic acid)$_{40}$ P16. (styrene)$_{40}$ (methyl methacrylate)$_{40}$ (acrylic acid)$_{20}$ P17. (ethyl acrylate)$_{60}$ (acrylic acid)$_{40}$ P18. (styrene)$_{40}$ (ethyl acrylate)$_{40}$ (acrylic acid)$_{20}$ P19. (methyl methacrylate)$_{40}$ (hexyl acrylate)$_{60}$ P20. (methyl methacrylate)$_{40}$ (butyl acrylate)$_{60}$ P21. (styrene)$_{30}$ (octadecyl acrylate)$_{70}$ P22. (methyl methacrylate)$_{32}$ (hexyl acrylate)$_{46}$ (poly(ethylene glycol) methyl ether acrylate, mw=404)$_{12}$ (acrylic acid)$_{10}$ P23. (hexyl acrylate)$_{40}$ (methyl methacrylate)$_{40}$ (sodium xylene sulfonate)$_{20}$ The foregoing primer and durable core/shell polymers are useful in encapsulating or forming a film or matrix with or covering or surrounding pigments or dyes and rendering them soluble or dispersible in water. In particular, the P-polymers (primer core/shell, formula II) are useful in providing a primer coating around the pigments or dyes, which promotes adhesion of the S-polymers (durable core/shell, formula I) to the pigments or dyes. Alternatively, the primer core/shell polymer may simply be an additive polymer, associated with the colorant, but not necessarily adhering to the surface of the colorant in the liquid ink.

Finally, the colorant may be available with a suitable polymeric coating on its surface from the manufacturer. For example, Sun Chemical provides the following coated pigments: YGD 9374 Yellow, YHD 9123 Yellow, YCD 9296 Yellow, YFD 1100 Yellow, QHD6040 Magenta, QFD1180 Magenta, RFD3217 Magenta, QFD1146 Magenta, RFD9364 Magenta, QFD 9334 Magenta, BCD6105 Cyan, BCD9448 Cyan, BCD6060 Cyan, BFD5002 Cyan, BFD1121 Cyan, and LHD9303 Black. These pigments are coated with an acrylic acid copolymer, such as acrylic acid-styrene or acrylic acid-acrylate or acrylic acid ethyl acetate. Such pre-coated polymers are also useful in the practice of the present invention.

In any event, both core/shell polymers disperse the pigment or dye in the ink-jet ink and the durable core/shell polymer promotes the formation of durable, smear-fast films of the ink upon drying. The primer core/shell polymer promotes adhesion of the durable core/shell polymer to the pigment upon drying. The resulting dried ink is essentially totally smear-fast and not capable of being reconstituted with water.

The primer, or additive, core/shell polymer (II) can be prepared by a bulk polymerization process which can provide a polymer solution or by an emulsion polymerization process which can provide a polymer suspension.

Figure 1B:
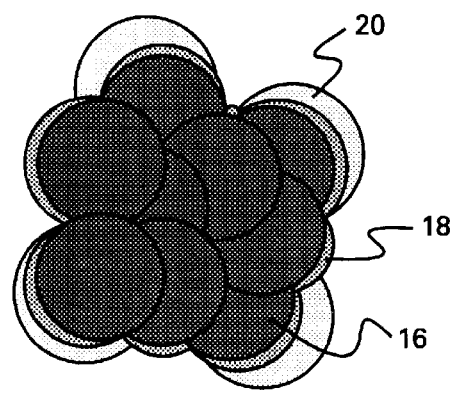
FIG. 1b is a schematic diagram depicting a dual encapsulated colorant ink of the present invention after printing.
Figure 1C:
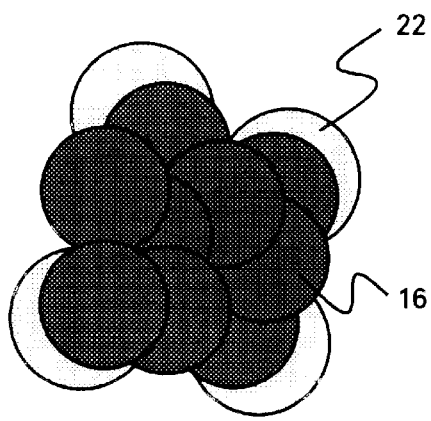
FIG. 1c is a schematic diagram depicting a dual encapsulated colorant ink wherein the additive polymer and durable core/shell polymer are incorporated into one copolymer.
Figure 2:
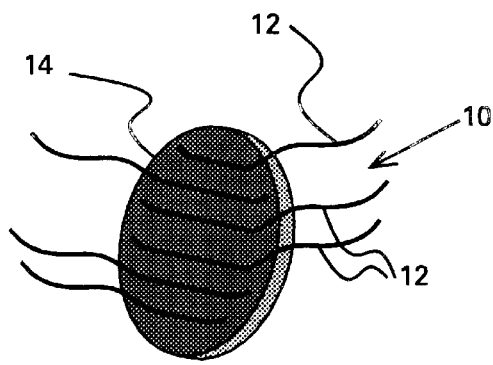
FIG. 2 is a schematic diagram depicting the structure of a core/shell polymer.

FIGS. 1a–1c depict various aspects of the invention, including a core/shell polymer comprising a hydrophilic shell 12 and a hydrophobic core 14 surrounding a pigment (colorant) 16 in water (FIG. 1a), a dual encapsulated colorant ink after being printed, comprising the pigment 16 surrounded by a primer polymer 18 and a durable polymer 20, and (c) a dual encapsulated colorant ink where the additive polymer and the durable core/shell polymer are incorporated into one copolymer 22 surrounding the pigment 16. FIG. 2 depicts the structure of a core/shell polymer 10 comprising a plurality of hydrophilic groups 12 and a plurality of hydrophobic groups 14. These Figures are schematic, and are believed to represent the colorant in association with the core/shell polymer(s).

For comparison, the following core/shell polymers are examples of polymers that evidence poor smear-fastness, and thus are outside the scope of the present invention. Factors that render these compositions outside the scope of the invention include the following:

(1) a too high hydrophilic portion in the total ink (the maximum hydrophilic portion permitted in the ink is 20 wt %); as a consequence, the durable core/shell polymer is soluble in water, which is undesirable;

(2) too little low $T_g$ component in the durable core/shell polymer, which consequently prevents bonding between the polymer particles or between the polymer and the print medium and thus prevents film-forming of the encapsulated ink (the minimum low $T_g$ component is 5 wt %); and (3) too much low $T_g$ component in the durable core/shell polymer, which consequently prevents polymerization of the monomer moieties, resulting instead in agglomeration and precipitation (the maximum low $T_g$ component is 60 wt %).

C1. (hexyl acrylate)$_{35}$ (methyl methacrylate)$_{35}$ (poly (ethylene glycol) methyl ether acrylate, mw=404)$_{30}$ C2. (hexyl acrylate)$_{20}$ (methyl methacrylate)$_{40}$ (poly (ethylene glycol) methyl ether acrylate, mw=404)$_{40}$ C3. (hexyl acrylate)$_{20}$ (methyl methacrylate)$_{60}$ (poly (ethylene glycol) methyl ether acrylate, mw=404)$_{20}$ C4. (hexyl acrylate)$_{20}$ (methyl methacrylate)$_{20}$ (poly (ethylene glycol) methyl ether acrylate, mw=2054)$_{60}$ C5. (hexyl acrylate)$_{20}$ (methyl methacrylate)$_{20}$(poly (ethylene glycol) methyl ether acrylate, mw=2054)$_{60}$ C6. (benzyl methacrylate)$_{60}$ (methyl methacrylic acid)$_{10}$ (triethylene glycol) methyl ether acrylate, mw=150)$_{30}$ C7. (styrene)$_{40}$ (methyl methacrylate)$_{30}$ (vinyl pyrrolidone)$_{30}$ C8. (styrene)$_{50}$ (methyl methacrylate)$_{10}$ (acrylamide)$_{40}$ C9. (styrene)$_{40}$ (methacrylic acid)$_{60}$ C10. (ethyl acrylate)$_{20}$ (methyl methacrylate)$_{40}$ (poly (ethylene glycol) methyl ether acrylate, mw=404)$_{40}$ C11. (propyl acrylate)$_{30}$ (methyl methacrylate)$_{30}$ (poly (ethylene glycol) methyl ether acrylate, mw=2054)$_{40}$ C12. (methyl methacrylate)$_{60}$ (poly(ethylene glycol) methyl ether acrylate, mw=218)$_{40}$ C13. (methyl methacrylate)$_{80}$ (poly(ethylene glycol) methyl ether acrylate, mw=404)$_{20}$ C14. (methyl methacrylate)$_{80}$ (poly(ethylene glycol) methyl ether acrylate, mw=2054)$_{20}$ C15. (styrene)$_{80}$(poly(ethylene glycol) methyl ether acrylate, mw=2054)$_{20}$ C16. (styrene)$_{30}$ (methyl methacrylate)$_{10}$ (vinylpyrrolidone)$_{60}$ C17. (hexyl acrylate)$_{80}$ (methyl methacrylate)$_{5}$ poly (ethylene glycol) methyl ether acrylate, mw=2054)$_{15}$ C18. (hexyl acrylate)$_{80}$ (methyl methacrylate)$_{5}$ poly (ethylene glycol) methyl ether acrylate, mw=404)$_{15}$ C19. (hexyl acrylate)$_{80}$ poly(ethylene glycol) methyl ether acrylate, mw=404)$_{15}$ C20. (hexyl acrylate)$_{80}$ poly(ethylene glycol) methyl ether acrylate, mw=218)$_{20}$.

Inks

The inks of the present invention comprise about 5 to 50 wt %, preferably about 10 to 25 wt %, water-miscible organic co-solvent, about 0.05 to 10 wt %, preferably about 0.5 to wt %, colorant, about 0.005 to 50 wt %, preferably about 0.1 to 10 wt %, more preferably about 0.5 to 5 wt %, durable core/shell polymer, about 0.005 to 50 wt %, preferably about 0.1 to 10 wt %, more preferably about 0.5 to 5 wt %, primer core/shell polymer, and water. Other components and additives to the ink may also be present, as discussed below.

Without being limited by theory, it is believed that the primer and durable core/shell polymers are encapsulating the colorants; this appears to be the case after printing the ink on a print medium, such as paper. However, the present invention is meant to include ink formulations which comprise the polymers and colorants without limit to the type of association between the colorant and the polymer.

The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, Monarch® 700, Cabojet200, Cabojet300, IJX55, and IJX76. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostapenn® Orange GR, Hostaperm® Scarlet GO, and Permanent Rubine F6B. The following pigments are available from Mobay: Quindo® Magenta, Indofast® Brilliant Scarlet, Quindo® Red $R_{6700}$, Quindo® Red $R_{6713}$, and Indofast® Violet. The following pigments are available from Sun Chemical: L74-1357 Yellow, L75-1331 Yellow, L75-2577 Yellow, YGD 9374 Yellow, YHD 9123 Yellow, YCD 9296 Yellow, YFD 1100 Yellow, QHD6040 Magenta, QFD 1180 Magenta, RFD3217 Magenta, QFD 1146 Magenta, RFD9364 Magenta, QFD 9334 Magenta, BCD6105 Cyan, BCD9448 Cyan, BCD6060 Cyan, BFD5002 Cyan, BFD1121 Cyan, and LHD9303 Black.

Dyes, whether water-soluble or water-insoluble, may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramnine O (Basic Yellow 2), all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

In the event that one or more surfactants are employed in place of hydrophilic groups on the smear-fast core/shell polymer, the concentration of such surfactant(s) is in the range of about 0.001 to 10 wt %, preferably about 0.01 to 5 wt %, of the ink.

The ratio of the durable to primer polymers is in the range between 100:1 and 1:100, preferably between 50:1 and 1:50, and more preferably between 10:1 and 1:10, weight basis. The ratio of the colorant to binder (total core/shell polymer content) is in the range between 100:1 and 1:100, preferably between 50:1 and 1:50, and more preferably between 10:1 and 1:10.

It is preferred that the concentration of the E component of the durable core/shell polymer be less than that of the E component in the primer core/shell polymer. Preferably, E in the durable core/shell polymer ranges from 0 to 20 wt %, while E in the primer core/shell polymer ranges from about 20 to 100 wt %.

It is possible to eliminate the need for a primer core/shell polymer if, in the formula for polymer (I), the value of r is kept between 3 and 10 wt %. In this limited case, one polymer can perform both functions of adhesion and durability.

The balance of the ink is water, together with other additives commonly added to inkjet inks, which are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The hydrophilic surface moieties serve to suspend the colorant in water, while preventing agglomeration in water. As a result, upon centrifugation at 3,000 rpm for 30 minutes, no sediment is formed. Thus, excellent pigment dispersion is obtained.

Without subscribing to any particular theory, it appears that upon printing the ink on a print medium, the coated colorant particles bond upon dehydration. The durable, smear-fast core/shell polymer has a $T_g$ near or somewhat above room temperature ($\approx 25°$ C.), which promotes print durability of the polymer. The primer core/shell polymer has a $T_g$ at or somewhat below room temperature. Due to the hydrophobic physical bonds, the ink, after drying, is non-soluble in water and in highlighter solvents, rendering the printed ink smear-fast. The presence of the UV moiety on the smear-fast core/shell polymer provides a UV and oxygen barrier, which also renders the printed ink lightfast. The printed ink is water-fast, evidencing an optical density (OD) of 0 milliOD (mOD) after drying for 5 minutes when subjected to a water-fast test. The printed ink is also smear-fast, and evidences an optical density of less than 20 mOD smear after drying for 5 minutes when subjected to two passes from a highlighter pen.

As an example, an ink comprises 20 wt % of one or more co-solvent(s), 3 wt % pigment, 3 wt % durable core/shell polymer, 1 wt % primer core/shell polymer, and water.

EXAMPLES

In the following examples, most of the monomers used were commercially available. The purity of such monomers is that found in normal commercial practice. Only the poly(ethylene glycol) methyl ether acrylate monomers of different molecular weights were prepared from the corresponding alcohol with acryloyl chloride in the presence of triethylamine by standard esterification process. Other monomers can be prepared by following conventional and well-known procedures of typical organic reactions.

Example 1

(Hexyl Acrylate)$_{40}$ (Methyl Methacrylate)$_{30}$ (PEGAc(404))$_{20}$ (D1)$_{10}$ Synthesis of durable core-shell polymer with hexyl acrylate (A), methyl methacrylate (MMA) (B), poly(ethylene glycol) methyl ether acrylate, mw=404 (C), and UV stabilizer (D1) (D) in the ratio of 40, 30, 20, and 10% by weight, respectively:

Hexyl acrylate (40 g), MMA (24 g), PEGAc(404) (16 g) and UV stabilizer D1(8 g) were mixed with BRIJ 92 (0.8 g), SOLSPERSE 27,000 (0.82 g), and isooctylmercaptopropionate (0.8 g) in water (12 g) to form an emulsion. The emulsion was saturated with nitrogen. Then the emulsion was added over a period of 1 hour to a solution of potassium persulfate (1.71 g) in water (703.09 g) at 80° C. The reaction mixture was maintained at 80° C. for 2.5 hour. The reaction mixture was then cooled to obtain the title polymer dispersed in water. The average particle size of the polymer solution was found to be 270 nm and the glass transition temperature ($T_g$) of the polymer obtained was 60° C.

Example 2

(Hexyl Acrylate)$_{30}$ (Methyl Methacrylate)$_{40}$ (Acrylamide)$_{30}$

Synthesis of durable core-shell polymer derived from hexyl acrylate (A), MMA (B), and acrylamide (C) in the ratio of 30, 40, and 30% by weight, respectively:

The monomers, hexyl acrylate (3 g), MMA (4 g), and acrylamide (3 g) were mixed in water (7 g) containing BRIJ 92 (0.22 g), Aerosol DPOS 45 (0.22 g), and isooctylmercaptopropionate (0.22 g) to form an emulsion. The emulsion was saturated with nitrogen and added dropwise to a solution of potassium persulfate (0.2 g) in water (82.14 g) at 100° C. Heating was continued for a period of 4 hours and cooled to obtain the title core-shell polymer. The average particle size of the polymer solution was found to be 200 nm and the glass transition temperature ($T_g$) of the polymer obtained was 75° C.

Example 3

(Hexyl Acrylate)$_{32}$ (Methyl Methacrylate)$_{46}$ (PEGAc(404))$_{12}$ (Acrylic Acid)$_{10}$ Synthesis of primer core-shell polymer derived from hexyl acrylate (A), MMA (B), PEGAc(404) (C), and sodium styrene sulfonate (E) in the ratio of 32, 46, 12, and 10% by weight, respectively:

The monomers, hexyl acrylate (25.6 g), MMA (36.8 g), poly(ethylene glycol) methyl ether acrylate (mw=404) (9.6 g) and acrylic acid (8 g) were mixed. To this mixture were added BRIJ 92 (0.81 g) and SOLSPERSE 27,000 (0.81 g). The chain transfer agent isooctyl-3-mercaptopro-pionate (0.82 g) was subsequently added. The mixture was shaken vigorously for 3 min, followed by sonication for 3 min to form an emulsion. The emulsion was saturated with nitrogen for 0.5 hr. Meanwhile, a solution of potassium persulfate (1.71 g) in water (700.85 g) was prepared in a three-necked 500 ml round bottom flask and saturated with nitrogen. The persulfate solution was heated to 75° C. The emulsion was added dropwise from an addition funnel to the aqueous persulfate solution over a period of 1 hr. The reaction temperature was maintained at the elevated temperature for 3.5 hr. The solution was then cooled to room temperature to obtain the core-shell polymer in water with a concentration of 10% by weight. The average particle size of the polymer solution was found to be 220 nm and the glass transition temperature ($T_g$) of the polymer obtained was 0° C.

Examples 4–5

Two additional polymers were formulated as in Examples 1–3. Example 4 is a durable core/shell polymer, comprising (hexyl acrylate)$_{30}$ (methyl methacrylate)$_{40}$ (PEG-Ac(404))$_{30}$. Example 5 is a primer core/shell polymer, comprising (lauryl methacrylate)$_{10}$ (methyl methacrylate)$_{20}$ (PEG-Ac(404))$_{67}$ (sodium styrene sulfonate)$_3$.

The polymers and their average particle sizes and glass transition temperatures are given in Table I below.

TABLE I

Results of Examples 4–5.

| Example | Polymer | Particle Size, nm | $T_g$, ° C. |
|---|---|---|---|
| 4 | (hexyl acrylate)$_{30}$ (methyl methacrylate)$_{40}$ (PEG-Ac(404))$_{30}$ | 180 | 0 |
| 5 | (lauryl methacrylate)$_{10}$ (methyl methacrylate)$_{20}$ (PEG-Ac(404))$_{67}$ (sodium styrene sulfonate)$_3$ | 140 | −15 |

Example 6

(Butyl Acrylate)$_{20}$ (Methyl Methacrylate)$_{80}$/ Surfactant (2 wt %)

Synthesis of polymer derived from butyl acrylate (A) and MMA (B) in the ratio of 20 and 80% by weight, respectively:

Butyl methacrylate (4 g) and methyl methacrylate (16 g) were mixed with BRIJ 92 (0.2 g), SOLSPERSE 27,000 (0.2 g), and isooctylmercaptopropionate (0.2 g).

An emulsion was prepared by adding water (2.0 g) to the above monomer mixture.

The emulsion was saturated with nitrogen and added dropwise to a solution of potassium persulfate (0.4 g) in water (177 g) at 75° C. The reaction mixture was maintained at the same temperature for another 2 hr to obtain the title polymer/surfactant system dispersed in water. The average particle size of the polymer solution was found to be 165 nm and the glass transition temperature ($T_g$) of the polymer obtained was 35° C.

Examples 7–10; Comparison Examples 1–2

Testing of the physical properties of several durable, film-forming, water-dispersive polymers was performed and compared to prior art polymers. The tests involved a film-forming test, a water-dispersive stability test, and a measurement of the glass transition temperature, $T_g$.

(1) Film Forming Test.

The core/shell polymer of the invention was cast on a glass substrate and allowed to dry at ambient conditions for several hours. As the film-forming process occurred, the milky color of the polymer solution gradually turned into a transparent film.

The formed film (on glass substrate) was soaked in water mixed with different solvents liquid additives (40% versus water) for 24 hrs and the weight loss was measured. The samples with the least weight loss samples are indicative of the most durable film.

(2) Water-Dispersive Stability Test.

The polymer emulsion was subjected to a centrifugation set at 4,000 rpm for minutes. This is repeated twice. The amount of accumulation after centrifugation is an indication of the dispersion stability, with a higher amount of accumulation indicating less dispersion stability.

(3) Measurement of $T_g$.

The glass transition temperature was measured by Differential Scanning Calorimetry, using a DSC available from duPont de Nemours Company as Model 2.0.

The data accumulated from the foregoing tests are illustrated in the following Table II:

TABLE II

Results of Tests.

| Example | Polymer | Solvent additives/ Weight loss (%) | Centrifugation Accumulation | $T_g$ (° C.) |
|---|---|---|---|---|
| 7 | $(HA)_{40}$ $(MMA)_{40}$ $(PEGAc(404))_{20}$ | Ethyl acetate, 0.05% | <0.5% | 30 |
| 8 | (octadecyl acrylate)$_{40}$ (methyl methacrylate)$_{40}$ (poly(ethylene glycol) methyl ether acrylate, mw = 404)$_{20}$ | Ethyl acetate, 0.05% | <0.1% | 10 |
| 9 | (acryloxypropylmethyl-dimethoxysilane)$_{30}$ (methyl methacrylate)$_{60}$ (poly(ethylene glycol) methyl ether acrylate, mw = 404)$_{20}$ | Ethyl acetate, 0.02% | <0.1% | 15 |
| 10 | (hexyl acrylate)$_{40}$ (maleimide)$_{40}$ poly(ethylene glycol) methyl ether acrylate, mw = 218)$_{20}$ | Ethyl acetate 0% | <0.01% | 25 |
| Comp. Ex. 1 | (Styrene)$_{40}$ (Acrylic Acid)$_{60}$ | Ethyl acetate 80% | 30% | 100 |
| Comp. Ex. 2 | Acrylic acid polymer | 100% | Soluble | 80 |

It will be appreciated that acrylic acid polymer, while not serving as a durable polymer, could be used in conjunction with any of the durable core/shell polymers as an additive polymer to improve the printability and printing reliability.

Example 11; Comparison Examples 3–5

Commercially available Cabot pigment plus polymer plus penetrating humectant plus non-penetrating humectant:

Example 11

In an 250 cm$^3$ glass jar were added 5.0 g of carbon black (Vulcan XR-72), 25.0 g of a durable core/shell polymer (S1) employed in the practice of the present invention comprising $(HA)_{40}(MMA)_{40}(PEGAc(404))_{20}$ (10 wt % solid), 10 g diethylene glycol (as non-penetrating humectant), 10 g N-methyl pyrrolidone (NMP, as penetrating humectant), 0.02 g of fluoro surfactant (Fluorad 99; 3M Products). The components were milled together by a paint shaker using 2 mm zirconium beads for 2 hrs. After being milled, the system was diluted with water to achieve a final ink solution of 5 wt % solid. The Zr beads were removed by 200 mesh filtering. The ink solution was centrifuged to eliminate agglomerated solids and the like and refiltered again through a 5 μm glass filter. This solution was then ready for print testing.

In order to perform the print test, the ink was filled into the black ink cartridge of a Hewlett-Packard Company DeskJet printer prototype product and printed with a frequency of 20 KHz.

The optical density (OD) of the print was measured by Mac Beth densitometer.

The decel characteristic of the pen was characterized as the stability of the firing process associated with the nucleated bubble occurred inside the pen. This characteristics was measured by the number of the streak lines appearing at the right hand site of a black solid band.

The stability of the ink was judged by measuring the changing of the particle size after the temperature cycle (T-cycle) between 70° C. and −70° C.

The particle size measurement is carried out by a Nikon particle sizer.

The kogation effect is a phenomenon in which the pen cannot perform due to the deterioration of the firing resistor in the ink chamber. So the kogation, generally, terminates the life of the pen. The kogation was measured by number of prints exhibiting unchanged print quality (PQ) during continuous printing process of 100 pages. The higher the number, the lower the kogation effect.

The smear-fastness was measured by the background optical density (in mOD) when a neighbor image area is wiped twice with a highlighter pen.

The waterfastness was measured by the background optical density (in mOD) when a water drip runs across an image area.

Comparison Example 3

Example 11 was repeated, except that the core/shell polymer S1 was replaced by the core/shell polymer C4 $(HA)_{20}$ $(MMA)_{20}$ $(PEGAc(2054))_{60}$.

Comparison Example 4

Example 11 was repeated, except the core/shell polymer S1 was replaced by poly(ethylene glycol) having molecular weight in the range of 5,000.

Comparison Example 5

Example 11 was repeated, except the core/shell polymer S1 was replaced by 98% hydrolyzed polyvinyl alcohol, average molecular weight=4,000.

The print tests results for Examples 11 and Comparison Examples 3–5 are summarized in Table III.

TABLE III

Results of Example 12 and Comparison Examples 3–5.

| Example | Optical density (OD) | Decels (lines/ cm) | Particle size change after T-cycle | # of prints before kogation | Smear-fastness (mOD) | Water-fastness (mOD) |
|---|---|---|---|---|---|---|
| 11 | 1.45 | 1.0 | +/− 3 nm | 100 | 35 | 0 |
| Comp. Ex. 3 | 1.42 | 2.0 | +/− 4 nm | 100 | 400 | 10 |
| Comp. | 1.40 | 1.0 | +/− 3 nm | 100 | 600 | 400 |

TABLE III-continued

Results of Example 12 and Comparison Examples 3–5.

| Example | Optical density (OD) | Decels (lines/cm) | Particle size change after T-cycle | # of prints before kogation | Smear-fastness (mOD) | Water-fastness (mOD) |
|---|---|---|---|---|---|---|
| Ex. 4 Comp. Ex. 5 | 1.45 | 3.0 | +/− 5 nm | 40 | 600 | 420 |

Examples 12–27; Comparison Examples 6–13

Example 11 was repeated, except that the core/shell polymer (S1) was replaced by various core/shell polymers as indicated in Table IV, below.

TABLE IV

Examples of Replacement Core/Shell Polymers

| Core shell polymer | $T_g$ < RT component, wt % | Smear fastness (mOD) | Water fastness (mOD) |
|---|---|---|---|
| Examples 12–27: | | | |
| Example 12. $(HA)_{40}$ $(MMA)_{40}$ $(PEGAc(404))_{20}$ (S1) | HA, 40% ($T_g$ = −60° C.) | 37 | 0 |
| Example 13. $(HA)_{30}(MMA)_{50}$ $(PEGAc(404))_{20}$ (S2) | HA, 30% ($T_g$ = −60° C.) | 45 | 0 |
| Example 14. $(HA)_{20}(MMA)_{60}$ $(PEGAc(404))_{20}$ (S3) | HA, 20% ($T_g$ = −60° C.) | 50 | 0 |
| Example 15. $(HA)_{40}$ $(MMA)_{40}$ $(PEGAc(2054))_{20}$ (S4) | HA, 40% ($T_g$ = −60° C.) | 38 | 0 |
| Example 16. $(HA)_{30}(MMA)_{50}$ $(PEGAc(2054))_{20}$ (S5) | HA, 30% ($T_g$ = −60° C.) | 40 | 0 |
| Example 17. $(HA)_{20}(MMA)_{60}$ $(PEGAc(2054))_{20}$ (S6) | HA, 30% ($T_g$ = −60° C.) | 50 | 0 |
| Example 18. $(HA)_{40}(MMA)_{30}$ $(D2)_{10}(PEGAc(404))_{20}$ (S48) | HA, 40% ($T_g$ = −60° C.) | 40 | 0 |
| Example 19. $(HA)_{50}$ $(MMA)_{45}$ $(PEGAc(404))_{5}$ (S52) | HA, 30% ($T_g$ = −60° C.) | 15 | 0 |
| Example 20. $(HA)_{60}$ $(MMA)_{40}$ (S55) | HA, 60% ($T_g$ = −60° C.) | 15 (Note 1) | 0 |
| Example 21. $(BA)_{40}$ $(MMA)_{40}$ $(PEGAc(404))_{20}$ (S12) | BA, 40% ($T_g$ = −40° C.) | 50 | 0 |
| Example 22. $(LMA)_{40}$ $(MMA)_{40}$ $(PEGAc(404))_{20}$ (S14) | LMA, 40% ($T_g$ = −100° C.) | 40 | 0 |
| Example 23. $(HEA)_{40}$ $(MMA)_{40}$ $(PEGAc(404))_{20}$ (S17) | HEA, 40% ($T_g$ = −10° C.) | 48 | 0 |
| Example 24. $(MLMA)_{40}$ $(MMA)_{40}$ $(PEGAc(404))_{20}$ (S18) | HLMA, 40% ($T_g$ = −40° C.) | 45 | 0 |
| Example 25. (Acryloxypropyl-methyl-DMS)$_{30}$ $(MMA)_{50}$ $(PEGAc(404))_{20}$ (S22) | Acryloxypropyl-methyl DMS, 30% ($T_g$ = −10° C.) | 40 | 0 |
| Example 26. $(AHA)_{30}$ $(MMA)_{50}$ $(PEGAc(2054))_{20}$ (S25) | AHA, 30% ($T_g$ = −20° C.) | 40 | 0 |
| Example 27. $(PA)_{40}$ $(MMA)_{40}$ $(VP.HCl)_{20}$ (P10) | PA, 40% ($T_g$ = −40° C.) | 40 | 0 |
| Comparison Examples 6–9: | | | |
| Comp. Example 6. $(MMA)_{80}$ $(PEGAc(404))_{20}$ (C13) | None | 100 | 0 |
| Comp. Example 7. $(MMA)_{80}$ $(PEGAc(404))_{20}$ (C14) | None | 90 | 0 |
| Comp. Example 8. $(MMA)_{80}$ $(PEGAc(2054))_{20}$ (C15) | None | 110 | 0 |
| Comp. Example 9. $(Sty)_{80}$ $(PEGAc(2054))_{20}$ (C16) | None | 80 | 0 |
| Comparison Examples 10–13: | | | |
| Comp. Example 10. $(HA)_{80}$ $(MMA)_{5}$ $(PEGAc(2054))_{15}$ (C18) | MMA, 5% ($T_g$ = 150° C.) | (Note 2) | |
| Comp. Example 11. $(HA)_{80}$ | MMA, 5% | (Note 2) | |
| $(MMA)_{5}$ $(PEGAc(404))_{15}$ (C19) | ($T_g$ = 150° C.) | | |
| Comp. Example 12. $(HA)_{80}$ $(PEGAc(404))_{20}$ (C20) | None | (Note 3) | |
| Comp. Example 13. $(HA)_{80}$ $(PBGAc(218))_{20}$ (C21) | None | (Note 3) | |

Notes:
1. Slightly unstable
2. Could not print - kogation
3. Polymer agglomerated The foregoing Table IV indicates that the polymers within the scope of the invention (Examples 12–27), when printed, have a smear-fastness of 50 mOD or less. These polymers include a component (moiety A) which, when homopolymerized, has a $T_g$ less than 25° C. (room temperature). In comparison, Comparative Examples 6–9 have no such low $T_g$ component, and, when printed, have a smear-fastness of 80 mOD or greater. Comparative Examples 10–13 include a component (moiety B), which, when homopolymerized, has a $T_g$ greater than 25° C., but the concentration of this component is less than the minimum specified of 10 wt % (5 wt % and 0 wt %). These polymers either evidenced severe kogation or agglomerated.

Examples 28–33; Comparative Examples 14–21

Examples 28–33 are directed to inks in which the pigment:polymer ratio was varied for various polymers. Comparative Example 14 is directed to an ink in which there is no binder. The smear-fastness (in mOD) is reported for each example.

Comparative Examples 15–21 are directed to certain polymer compositions found to have poor smear-fastness, as listed above. These examples are C2, C2, C3, C4, C6, C7, and C 17, from the list above, and all have high hydrophilic content.

TABLE V

Comparison of Smear-fastness with and without Binder;
Comparison of Smear-fastness with High Hydrophilic Component.

| Examples 28–33: | Pigment:polymer ratio | Smear fastness (mOD) |
|---|---|---|
| Examples 28–33: | | |
| Example 28. $(HA)_{40}$ $(MMA)_{40}$ $(PEGAc(404))_{20}$ (S1) | 1:2 | 30 |
| Example 29. $(HA)_{40}$ $(MMA)_{40}$ $(PEGAc(404))_{20}$ (S1) | 1:1.5 | 39 |
| Example 30. $(HA)_{40}$ $(MMA)_{40}$ $(PEGAc(404))_{20}$ (S1) | 2:1 | 45 |
| Example 31. $(HA)_{40}$ $(MMA)_{40}$ $(PEGAc(2054))_{20}$ (S4) | 1:2 | 34 |
| Example 32. $(HA)_{40}$ $(MMA)_{40}$ $(PEGAc(404))_{20}$ (S1) | 4:1 | 45 |
| Example 33. $(HA)_{40}$ $(MMA)_{40}$ $(PEGAc(404))_{20}$ (S1) | 6:1 | 50 |
| Comparison Example 14: | | |
| No polymer | — | 100 |
| Hydrophilic | | |

TABLE V-continued

Comparison of Smear-fastness with and without Binder; Comparison of Smear-fastness with High Hydrophilic Component.

| Comparison examples 15–21: | components, wt. % | | |
|---|---|---|---|
| Comp. Example 15. $(HA)_{35}$ $(MMA)_5$ $(PEGAc(404))_{60}$ (C1) | $(PEGAc(404))$, 60% | | 65 |
| Comp. Example 16. $(HA)_{20}$ $(MMA)_{10}$ $(PEGAc(404))_{70}$ (C2) | $(PEGAc(404))$, 70% | | 70 |
| Comp. Example 17. $(HA)_{10}(MMA)_{30}$ $(PEGAc(404))_{60}$ (C3) | $(PEGAc(404))$, 60% | | 100 |
| Comp. Example 18. $(HA)_{20}(MMA)_{20}$ $(PEGAc(2054))_{60}$ (C4) | $(PEGAc(2054))$, 60% | | 100 |
| Comp. Example 19. $(BMA)_{60}$ $(MMA)_{10}$ $(TEGAc(150))_{30}$ (C6) | $(TEGAc(150))$, 30% | | 250 |
| Comp. Example 20. $(Sty)_{40}(MMA)_{30}$ $(VP)_{30}$ (C7) | VP, 30% | | 400 |
| Comp. Example 21. $(Sty)_{30}$ $(MMA)_{10}$ $(VP)_{60}$ (C17) | VP, 60% | | 400 |

The results show that the presence of the durable core/shell polymer reduces the smear-fastness from 100 mOD to 50 mOD and less, depending on the ratio of pigment to polymer. Further, employing a high concentration of the hydrophilic (30 wt % or greater) results in a substantial increase in smear-fastness; this is to be compared with Examples 13–20, and 22–28, all of which have a maximum concentration of 20 wt % and, consequently, a much lower smear-fastness value.

Examples 34–45

Experiment With Colorants Having Anionic Species

Example 11 was repeated, except that the non-treated carbon black Vulcan XR-72 was replaced by colorants having anionic species with results listed in Table VI below.

TABLE VI

Smear-Fastness and Water-Fastness for Anionic Pigments and Dyes.

| Colorants | Color | Ionic Species | Smear-fastness, mOD | Water-fastness, mOD |
|---|---|---|---|---|
| Example 34. Cabo-jet 200[1] | Carbon Black | Sulfonate salt | 40 | 0 |
| Example 35. Cabo-jet 300[1] | Carbon Black salt | Carboxylate | 40 | 0 |
| Example 36. IJX76[1] | Carbon Black | Carboxylate salt | 40 | 0 |
| Example 37. Sulforhodamine B[2] | Magenta dye | Sulfonate | 50 | 2 |
| Example 38. Acid Blue 113[2] | Cyan Dye | Sulfonate | 45 | 1 |
| Example 39. Acid Blue 29[2] | Cyan Dye | Sulfonate | 45 | 1 |
| Example 40. Acid Red 4[2] | Red Dye | Sulfonate | 45 | 1 |
| Example 41. Rose Bengal[2] | Magenta Dye | Carboxylate salt | 45 | 1 |
| Example 42. Acid Yellow 17[2] | Yellow Dye | Sulfonate | 45 | 1 |
| Example 43. Acid Yellow 29[2] | Yellow Dye | Sulfonate | | 1 |

TABLE VI-continued

Smear-Fastness and Water-Fastness for Anionic Pigments and Dyes.

| Colorants | Color | Ionic Species | Smear-fastness, mOD | Water-fastness, mOD |
|---|---|---|---|---|
| Example 44. Acid Yellow 42[2] | Yellow Dye | Sulfonate | 45 | 0 |
| Example 45. Acridine Yellow G[2] | Yellow Dye | Sulfonate | 45 | 0 |

Notes:
[1]Cabot Corporation
[2]Aldrich Chemical

It will be seen that Examples 34–45 all evidenced good smear-fastness and water fastness, indicating that the inventive approach is suitably employed with anionic pigments as well as anionic dyes.

Examples 46–59

Experiment With Colorant Having Cationic Species

Example 11 was repeated, except that the non-treated carbon black Vulcan XR-72 was replaced by colorants having cationic species with results listed in Table VII below and that the durable core/shell polymer S1 was replaced by a cationic primer core/shell polymer P10.

TABLE VII

Smear-Fastness and Water-Fastness for Cationic Pigments and Dyes.

| Colorants | Color | Ionic species | Smear-Fastness, mOD | Water-fastness, mOD |
|---|---|---|---|---|
| Example 46. IJX55[1] | Carbon Black | Pyridinium quaternary salt | 35 | 0 |
| Example 47. Acriflavine hydrochloride | Yellow Dye | Quaternary salt | 50 | 1 |
| Example 48. Nitro Blue Tetrazolium Chloride monohydrate or Nitro BT[2] | Cyan Dye | Quaternary salt | 50 | 1 |
| Example 49. Rhodamine 6G[2] | Magenta Dye | Quaternary salt | 40 | 0 |
| Example 50. Rhodamine 123 hydrate[2] | Magenta Dye | Quaternary salt | 40 | 1 |
| Example 51. Rhodamine B[2] | Magenta Dye | Quaternary salt | 40 | 1 |
| Example 52. Rhodamine B isothiocyanate[2] | Magenta Dye | | 45 | 1 |

TABLE VII-continued

Smear-Fastness and Water-Fastness for Cationic Pigments and Dyes.

| Colorants | Color | Ionic species | Smear-Fastness, mOD | Water-fastness, mOD |
|---|---|---|---|---|
| Example 53. Safranine O[2] | Red Dye | | 40 | 0 |
| Example 54. Azure B[2] | Cyan Dye | | 37 | 0 |
| Example 55. Azure B Eosinate[2] | Cyan Dye | | 35 | 0 |
| Example 56. Basic Blue 47[2] | Cyan Dye | | 37 | 0 |
| Example 57. Basic Blue 66[2] | Cyan Dye | | 37 | 0 |
| Example 58. Thioflacin T (Basic Yellow 1)[2] | Yellow Dye | | 40 | 0 |
| Example 59. Auramine O (Basic Yellow 2)[2] | Yellow Dye | | 40 | 1 |

Notes:
[1]Cabot Corporation
[2]Aldrich Chemical

It will be seen that Examples 46–59 all evidenced good smear-fastness and water fastness, indicating that the inventive approach is suitably employed with cationic pigments as well as cationic dyes. COMPARISON EXAMPLE 28

In an 250 cm$^3$ glass jar were added 5.0 g of carbon black (Cabojet 300, from Cabot Corp.), 25.0 g of a core/shell polymer (S1) employed in the practice of the present invention comprising $(HA)_{40}(MMA)_{40}(PEGAc(404))_{20}$ (10 wt % solid), 10 g diethylene glycol (as non-penetrating humectant), 10 g N-methyl pyrrolidone (NMP, as penetrating humectant), 0.02 g of fluoro surfactant (Fluorad 99; 3M Products). The components were milled together using a roll miller (low shear) without milling media for 4 hrs. After being milled, the system was diluted with water to achieve a final ink solution of 5 wt % solid. The ink solution was centrifuged to remove uneven material, such as agglomerated solids and the like, and was refiltered again through a 5 μm glass filter. This solution was then ready for print testing, as in Example 12. The optical density was measured to be 1.1, with a lot of streaks, due to nozzle clogging.

Example 60

Comparative Example 28 was repeated, except that the durable core/shell polymer S1 was replaced by a mixture of durable core/shell polymer S1 and primer core/shell polymer P22. The ratio of the durable core/shell polymer S1 to the primer core/shell polymer P22 was 4:1. The optical density was measured to be 1.5, with no nozzle clogging.

Examples 61–63

Example 60 was repeated, except that the primer core/shell polymer P22 was replaced with other primers: P3, P4, and P12. The results of Comparative Example 28 and Examples 86–89 are presented in Table VIII below.

TABLE VIII

Print Results of Inks with and without Primer Core/Shell Polymer

| Example | Durable Core/Shell | Primer Core/Shell | OD | Printability |
|---|---|---|---|---|
| Comp. Ex. 28 | S1. $(HA)_{40}$ $(MMA)_{40}$ $(PEGAc(404))_{20}$ | none | 1.1 | Poor, many nozzles out |
| 60 | S1 | P22. $(HA)_{32}$ $(MMA)_{46}$ $(PEGAc(404))_{12}$ $(Acrylic Acid)_{10}$ | 1.5 | Excellent, no nozzles out |
| 61 | S1 | P12. $(HA)_{40}$ $(MMA)_{40}$ (Na-Styrene Sulfonate)$_{20}$ | 1.45 | Good, no nozzles clogged |
| 62 | S1 | P4. $(HA)_{40}$ $(MMA)_{40}$ (Vinyl benzoic acid)$_{20}$ | 1.47 | Excellent, no print streaks |
| 63 | S1 | P3. $(HA)_{40}$ $(MMA)_{40}$ (Maleic acid)$_{20}$ | 1.55 | Excellent, no streaks |

The results of Examples 60–63 and Comparative Example 28 indicate that better printing is obtained with the primer present for low shear mixing conditions.

Summarizing, the foregoing results show the superiority of an ink employing dual encapsulation of a colorant, comprising a primer core/shell polymer and a durable core/shell polymer of the invention, as compared to inks that do not employ the dual encapsulation of the colorant. Specifically, kogation is reduced and smear-fastness and water-fastness are considerably improved using the dual encapsulation of the present invention.

Thus, there has been disclosed a dual encapsulation of a colorant by a primer core/shell polymer and a durable core/shell polymer, in which the durable core/shell polymer is a durable, film-forming, water-dispersive polymer having at least one hydrophobic portion and either a hydrophilic portion or a surfactant associated with the polymer for dispersing molecules or particles in water and in which the primer core/shell polymer has at least one hydrophobic portion and a hydrophilic portion. It will be appreciated by those skilled in the art that various changes and modifications of an obvious nature may be made, and all such changes and modifications are considered to fall within the scope of the invention.

What is claimed is:

1. An ink-jet ink for inkjet printing including a vehicle and a colorant, said colorant encapsulated by or associated with a primer core/shell polymer to form a primer/colorant combination, and said primer/colorant combination, upon printing, encapsulated by a durable core/shell polymer, said primer core/shell polymer serving to provide adhesion of said durable core/shell polymer to said colorant and said durable core/shell polymer serving to provide a durable, smear-fast film upon drying of said ink on a print medium.

2. The ink-jet ink of claim 1 wherein said primer core/shell polymer comprises a hydrophobic core and a hydrophilic shell comprising a polar component and wherein said durable core/shell polymer comprises a hydrophobic core comprising a low $T_g$ component, which, when homopolymerized, has a glass transition temperature, $T_g$, below 25° C. and a high $T_g$ component, which, when homopolymerized, has a glass transition temperature above 25° C. and a hydrophilic shell selected from the group consisting of neutral shells, cationic shells, and anionic shells.

3. The ink-jet ink of claim 2 wherein said primer core/shell polymer either coats said colorant while in said ink prior to printing or is associated with said colorant while in said ink.

4. The ink-jet ink of claim 1 wherein said colorant is selected from the group consisting of pigments, water-soluble dyes, and water-insoluble dyes.

5. The ink-jet ink of claim 4 wherein said colorant is present in said ink in a concentration within a range of about 0.5 to 10 wt %.

6. The ink-jet ink of claim 1 wherein (a) said durable core/shell polymer has at least one hydrophobic portion and either a hydrophilic portion or a surfactant associated with said durable core/shell polymer for dispersing water-insoluble molecules or particles in water, said durable core/shell polymer having a formula given by

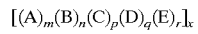

wherein A, B, C, D, and E are moieties as follows:
A=at least one hydrophobic component contributing to improved durable, film-forming properties selected from moieties which, when homopolymerized to a solid state, have a glass transition temperature ($T_g$) in the range between −100° and 25° C.;
B=at least one hydrophobic and solvent barrier moiety used to adjust the $T_g$ of the hydrophobic component of said polymer which, when homopolymerized to a solid state, has a $T_g$ greater than 25° C.;
C=at least one hydrophilic component comprising a water-soluble monomer;
D=at least one UV absorber;
E=at least one moiety having at least one highly polar functional group;
m=10 to 90 wt %;
n=10 to 90 wt %;
p=0 to 60 wt %;
q=0 to 50 wt %;
r=0 to 40 wt %;
m+n+p+q+r=100 wt %; and
x=1 to 100,000, wherein said durable core/shell polymer has either hydrophobic and hydrophilic moieties or has only hydrophobic moieties and is associated with said surfactant to form a polymer/surfactant system, said durable core/shell polymer or polymer/surfactant system capable of forming a film from water, which, upon dehydration, is essentially resistant to water, and (b) said primer core/shell polymer has at least one hydrophobic portion and a hydrophilic portion for dispersing water-insoluble molecules or particles in water, said primer core/shell polymer having a formula given by

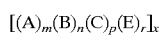

wherein A, B, C, and E are moieties as described above,
m=0 to 90 wt %;
n=0 to 90 wt %;
p=0 to 90 wt %;
r=0.01 to 100 wt %;
m+n+p+r=100 wt %; and
x=1 to 100,000, wherein said primer core/shell polymer has both hydrophobic and hydrophilic moieties, said primer core/shell polymer capable of forming an adhesive layer between said colorant and said durable core/shell polymer upon printing of said ink.

7. The ink-jet ink of claim 6 wherein said A moiety is $$CR_1R_2=C(R_3)R_4R_5,$$

where
$R_1$ and $R_2$ are independently hydrogen, halogen, alkyl, aryl, or substituted alkyl or aryl, or vinyl butyral,
$R_3$ is hydrogen, halogen, alkyl, alkoxy, alkylene, aryl, or substituted alkyl, alkoxy, alkylene, or aryl,
$R_4$ is direct bond, O, CO, N, halogen, alkyl, alkylene, aryl, or substituted alkyl, alkylene, aryl, or CN,
$R_5$ is hydrogen, N, O, alkyl, alkylene, aryl, or substituted alkyl, alkylene, or aryl, and
$R_6$ is N, alkyl, alkoxy, alkylene, aryl, aroxy, or substituted alkyl, alkylene, or aryl, and
where said alkyl, alkylene, aryl, alkoxy, and aroxy each contain more than 1 carbon atom and less than 40 carbon atoms.

8. The ink-jet ink of claim 7 wherein said A moiety is selected from the group consisting of ethyl acrylate; ethyl methacrylate; ethyl butacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicycopentyl ether acrylate; vinyl ethyl ketone; vinyl propyl ketone; vinyl hexyl ketone; vinyl octyl ketone; vinyl butyl ketone; cyclohexyl acrylate; 3-methacryloxypropyldimethylmethoxysilane; 3-methacryloxypropylmethyldimethoxysilane; 3-methacryloxypropylpentamethyldisiloxane; 3-methacryloxypropyltris(trimethylsiloxy)silane; 3-acryloxypropyldimethylmethoxysilane; acryloxypropylmethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; N,N-dihexyl acrylamide; N,N-dioctyl acrylamide; aminoethyl acrylate; aminoethyl methacrylate; aminoethyl butacrylate; aminoethylphenyl acrylate; aminopropyl acrylate; aminopropyl methacrylate; aminoisopropyl acrylate; aminoisopropyl methacrylate; aminobutyl acrylate; aminobutyl methacrylate; aminohexyl acrylate; aminohexyl methacrylate; aminooctadecyl methacrylate; aminooctadecyl acrylate; aminolauryl methacrylate; aminolauryl acrylate; N,N-dimethyl-aminoethyl acrylate; N,N-dimethylaminoethyl methacrylate; N,N-diethylaminoethyl acrylate; N,N-diethylaminoethyl methacrylate; piperidino-N-ethyl acrylate; vinyl propionate; vinyl acetate; vinyl butyrate; vinyl butyl ether; and vinyl propyl ether.

9. The ink-jet ink of claim 6 wherein said B moiety is

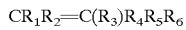

CR$_1$R$_2$=C(R$_3$)R$_4$R$_5$R$_6$ where R$_1$ and R$_2$ are independently selected from hydrogen, halogen, and vinyl butyral, R$_3$ is hydrogen, halogen, alkyl, alkoxy, alkylene, aryl, or substituted alkyl, alkoxy, alkylene, or aryl, R$_4$ is direct bond, O, CO, N, NO$_2$, halogen, alkyl, alkylene, aryl, or substituted alkyl, alkylene, aryl, R$_5$ is hydrogen, N, O, alkyl, alkylene, aryl, or substituted alkyl, alkylene, or aryl, and R$_6$ is alkyl, alkoxy, alkylene, aryl, aroxy, or substituted alkyl, alkylene, or aryl, and where said alkyl, alkylene, aryl, alkoxy, and aroxy each contain from 1 to 40 carbon atoms, where R$_1$ and R$_2$ and R$_2$ and R$_3$ can each form a ring, and where R$_4$ and R$_5$ can form a ring through nitrogen or oxygen.

10. The ink-jet ink of claim 9 wherein said B moiety is selected from the group consisting of ethylene; styrene; vinyl carbazole; vinyl naphthalene; vinyl anthracene; vinyl pyrene; methyl methacrylate; methyl acrylate; alpha-methylstyrene; dimethylstyrene; methylstyrene; vinylbiphenyl; glycidyl acrylate; glycidyl methacrylate; glycidyl propylene; 2-methyl-2-vinyl oxirane; vinyl pyridine, aminoethyl acrylate, aminoethyl methacrylate, aminoethylphenyl acrylate; maleimide; N-phenyl maleimide; N-hexyl maleimide; N-vinyl-phthalimide; and N-vinyl maleimide.

11. The ink-jet ink of claim 6 wherein said C moiety is selected from the group consisting of (a)

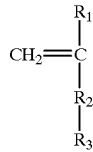

where

R$_1$=H, halogen, alkyl, aryl, or substituted alkyl or aryl;
R$_2$=direct bond, O, CO, NH, or CONH;

R$_3$=OH, (CH$_2$CH$_2$O)$_y$R$_4$, or (CH$_2$CH(CH$_3$)O)$_y$R$_4$;
y=1 to 200; and
R$_4$=alkyl, aryl, substituted alkyl or aryl;

(b)

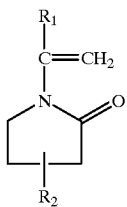

where

R$_1$ and R$_2$ are independently selected from H, halogen, alkyl, aryl, and substituted alkyl and aryl, where said alkyl and aryl each contain from 2 to 40 carbon atoms;

(c)

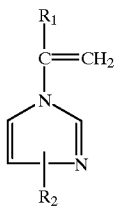

where

R$_1$ and R$_2$ are independently selected from H, halogen, alkyl, aryl, and substituted alkyl and aryl; and (d)

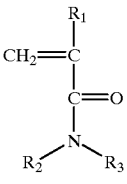

where

R=H, halogen, alkyl, aryl or substituted alkyl or aryl; and
R$_2$ and R$_3$ are either independently selected from alkyl, aryl, and substituted alkyl and aryl or can form either an aliphatic ring or an aromatic ring.

12. The ink-jet ink of claim 11 wherein said C moiety is selected from the group consisting of poly(ethylene glycol) methyl ether acrylate of average molecular weight 404; poly(ethylene glycol) methyl ether methacrylate of average molecular weight 418; poly(ethylene glycol) methyl ether methacrylate of average molecular weight 2068; poly (ethylene glycol) methyl ether acrylate of average molecular weight 2054; polyvinyl alcohol; vinyl pyrrolidone; vinyl 4-methylpyrrolidone; vinyl 4-phenylpyrrolidone; vinyl imidazole; vinyl 4-methylimidazole; vinyl 4-phenylimidazole; acrylamide; methacrylamide; N,N-dimethyl acrylamide; N-methyl acrylamide; N-methyl methacrylamide; aryloxy piperidine; and N,N-dimethyl acrylamide.

13. The ink-jet ink of claim 6 wherein said D moiety is selected from the group consisting of

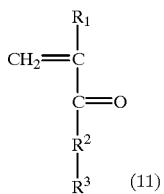

$R^1$=H, Alkyl, aryl, substituted alkyl or aryl  $R^2$=O or NH

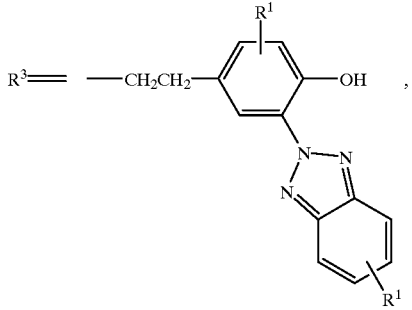

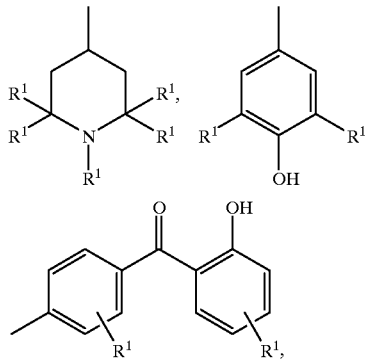

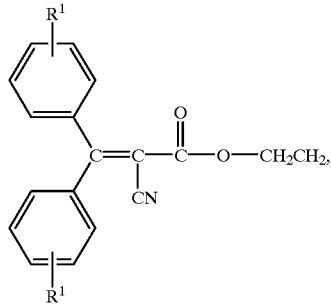

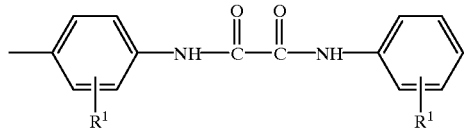

14. The ink-jet ink of claim 6 wherein said E moiety is selected from the group consisting of $$CH(R_1)=C(R_2)R_3COOH \quad (a)$$

where
$R_1$=H, COOH, COOR$_4$;
$R_2$=H, halogen, alkyl, aryl, alkoxyl, substituted alkyl, aryl or alkoxyl;
$R_3$=direct bond, alkylene, arylene, or substituted alkylene or arylene; and
$R_4$=alkyl, aryl, or substituted alkyl or aryl;

$$CH_2=CHR_1NR_2R_3 \quad (b)$$

where
$R_1$=alkylene, arylene, substituted alkylene or arylene, or SO$_2$; and
$R_2$ and $R_3$ are either independently selected from H, alkyl, aryl, and substituted alkyl, aryl and alkoxyl or form either an aliphatic or aromatic ring;

$$y(CH_2=CHR_1COO^-)M^{y+} \quad (c)$$

where
$R_1$=alkylene, arylene, substituted alkylene or arylene;
y=1 to 4; and
$M^{y+}$=NH$_{4+}$, Li$^+$, Na$^+$, K$^+$, Ca$^{2+}$, Mg$^{2+}$, Al$^{3+}$, Ti$^{4+}$, triethylammonium, diethylammonium, and pyrridinium;

$$z(CH_2=CHR_1N^+R_2R_3R_4)X^{z-} \quad (d)$$

where
$R_1$=alkylene, arylene, substituted alkylene or arylene, COO, or cyclic ring containing nitrogen;
$R_2$, $R_3$, and $R_4$ are independently selected from H, alkyl, aryl, alkoxyl, and substituted alkyl, aryl and alkoxyl;
z=1 to 4; and
X=halogen, BF$_4$, PF$_6$, ClO$_4$, SCN, CNO, CNS;
(e)

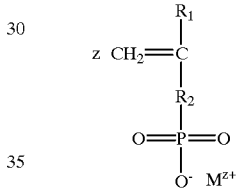

where
$R_1$=H, alkyl, aryl, alkoxyl, substituted alkyl, aryl or alkoxyl;
$R_2$=direct bond, alkylene, arylene, or substituted alkylene or arylene;
z=1 to 4; and
$M^{z+}$=NH$_4^+$, Li$^+$, Na$^+$, K$^+$, Ca$^{2+}$, Mg$^{2+}$, Al$^{3+}$, Ti$^{4+}$, triethylammonium, diethylammonium, and pyrridinium;
(f)

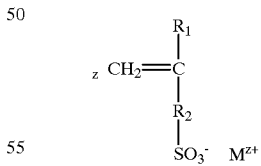

where
$R_1$=H, alkyl, aryl, alkoxyl, or substituted alkyl, aryl or alkoxyl;
$R_2$=direct bond, COOR$_3$, arylene, alkylene, or —CONHR$_3$;
$R_3$=alkylene, arylene, or substituted alkylene or arylene, or fluoroalkylene;
z=1 to 4; and
$M^{z+}$=NH$_4^+$, Li$^+$, Na$^+$, K$^+$, Ca$^{2+}$, Mg$^{2+}$, Al$^{3+}$, Ti$^{4+}$;

(g)

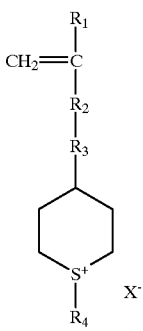

where
$R_1$=—H, halogen, alkyl, or aryl;
$R_2$=>CO, —O—;
$R_3$=direct bond, >NH;
$R_4$=alkyl or aryl; and
$X=Cl, Br, BF_4, ClO_4, I,$ or $NO_3$;

(h)

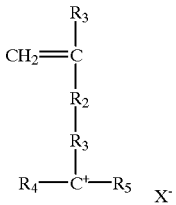

where
$R_1$=—H, halogen, alkyl, or aryl;
$R_2$=>CO, —O—;
$R_3$=direct bond, >NH, alkylene, or arylene;
$R_4$ and $R_5$ are independently selected from alkyl or aryl; and
$X=SbF_5FSO_3$;

(i)

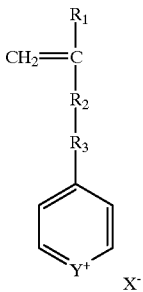

where
Y=O or S;
$R_1$=—H, halogen, alkyl, or aryl;
$R_2$=>CO, —O—;
$R_3$=direct bond, >NH, alkylene, or arylene;
$X=Cl, Br, I, ClO_4,$ and $BF_4$; and
a tetrazolium salt.

15. The ink-jet ink of claim 14 wherein said E moiety is selected from the group consisting of acrylic acid; methacrylic acid; chloromethacrylic acid; maleic acid; allylamine; N,N-diethylallylamine; vinyl sulfonamide; sodium acrylate; sodium methacrylate; ammonium acrylate; ammonium methacrylate; acrylamidopropanetriethylammonium chloride; methacrylamidopropanetriethylammonium chloride; vinylpyridine hydrochloride; sodium vinyl phosphonate and sodium 1-methylvinylphosphonate; sodium vinyl sulfonate; sodium 1-methylvinyl-sulfonate; sodium styrenesulfonate; sodium acrylamidopropanesulfonate; sodium methacrylamidopropanesulfonate; and sodium vinyl morpholine sulfonate.

16. The ink-jet ink of claim 6 wherein said surfactant is selected from the group consisting of anionic, cationic, non-ionic, and zwitterionic surfactants.

17. The ink-jet ink of claim 16 wherein said surfactant is selected from the group consisting of polyethylene oxide ethers; polypropylene oxide ethers; alkyl phenyl polyethylene oxides; acetylenic ethylene oxides; polyethylene oxide esters; polyethylene oxide diesters; polyethylene oxide amines; protonated polyethylene oxide amines; polyethylene oxide amides; polypropylene oxide esters; polypropylene oxide diesters; polypropylene oxide amines; protonated polypropylene oxide amines; polypropylene oxide amides; dimethicone copolyols; quaternary ammonium compounds; aerosols; sulfonates; ethoxylates, amine oxides, and betaines.

18. The ink-jet ink of claim 16 wherein said surfactant is present within a range of about 0.001 to 30 wt %, and the balance said polymer.

19. The ink-jet ink of claim 6 wherein said durable core/shell polymer is selected from the group consisting of (hexyl acrylate)$_{40}$ (methyl methacrylate)$_{40}$ (poly(ethylene glycol) methyl ether acrylate, mw=404)$_{20}$; (hexyl acrylate)$_{30}$ (methyl methacrylate)$_{50}$ (poly(ethylene glycol) methyl ether acrylate, mw=404)$_{20}$; (hexyl acrylate)$_{20}$ (methyl methacrylate)$_{60}$ (poly(ethylene glycol) methyl ether acrylate, mw=404)$_{20}$; (hexyl acrylate)$_{40}$ (methyl methacrylate)$_{40}$ (poly(ethylene glycol) methyl ether acrylate, mw=2054)$_{20}$; (hexyl acrylate)$_{30}$ (methyl methacrylate)$_{50}$ (poly(ethylene glycol) methyl ether acrylate, mw=2054)$_{20}$; (hexyl acrylate)$_{20}$ (methyl methacrylate)$_{60}$ (poly(ethylene glycol) methyl ether acrylate, mw=2054)$_{20}$; (hexyl acrylate)$_{40}$ (methyl methacrylate)$_{40}$ (poly(ethylene glycol) methyl ether acrylate, mw=218)$_{20}$; (hexyl acrylate)$_{30}$ (methyl methacrylate)$_{50}$ (poly(ethylene glycol) methyl ether acrylate, mw=218)$_{20}$; (hexyl acrylate)$_{20}$ (methyl methacrylate)$_{60}$ (poly(ethylene glycol) methyl ether acrylate, mw=218)$_{20}$; (ethyl acrylate)$_{40}$ (methyl methacrylate)$_{40}$ (poly(ethylene glycol) methyl ether acrylate, mw=404)$_{20}$; (propyl acrylate)$_{40}$ (methyl methacrylate)$_{40}$ (poly(ethylene glycol) methyl ether acrylate, mw=404)$_{20}$; (butyl acrylate)$_{40}$ (methyl methacrylate)$_{40}$ (poly(ethylene glycol) methyl ether acrylate, mw=404)$_{20}$; (octadecyl acrylate)$_{40}$ (methyl methacrylate)$_{40}$ (poly(ethylene glycol) methyl ether acrylate, mw=404)$_{20}$; (lauryl methacrylate)$_{40}$ (methyl methacrylate)$_{40}$ (poly(ethylene glycol) methyl ether acrylate, mw=404)$_{20}$; (octadecyl methacrylate)$_{40}$ (methyl methacrylate)$_{40}$ (poly(ethylene glycol) methyl ether acrylate, mw=404)$_{20}$; (hydroxyoctadecyl acrylate)$_{40}$ (methyl methacrylate)$_{40}$ (poly(ethylene glycol) methyl ether acrylate, mw=404)$_{20}$; (hydroxyethyl acrylate)$_{40}$ (methyl methacrylate)$_{40}$ (poly(ethylene glycol) methyl ether acrylate, mw=404)$_{20}$; (hydroxylauryl methacrylate)$_{40}$ (methyl methacrylate)$_{40}$ (poly(ethylene glycol) methyl ether acrylate, mw=404)$_{20}$; (phenethyl acrylate)$_{40}$ (methyl methacrylate)$_{40}$ (poly(ethylene glycol) methyl ether acrylate, mw=404)$_{20}$; (6-phenylhexyl acrylate)$_{40}$ (methyl methacrylate)$_{40}$ (poly(ethylene glycol) methyl ether acrylate, mw=404)$_{20}$; (cyclohexyl acrylate)$_{40}$ (methyl methacrylate)$_{40}$ (poly(ethylene glycol) methyl ether acrylate, mw=404)$_{20}$; (acryloxypropylmethyldimethoxysilane)$_{30}$ (methyl methacrylate)$_{50}$ (poly(ethylene glycol) methyl ether acrylate, mw=404)$_{20}$; (N,N-dihexyl acrylamide)$_{20}$ (methyl methacrylate)$_{60}$ (poly(ethylene glycol) methyl ether acrylate, mw=404)$_{20}$; (aminopropyl acrylate)$_{40}$ (methyl methacrylate)$_{40}$ (poly(ethylene glycol) methyl ether acrylate, mw=2054)$_{20}$; (aminohexyl acrylate)$_{30}$ (methyl methacrylate)$_{50}$ (poly(ethylene glycol) methyl ether acrylate, mw=2054)$_{20}$; (aminolauryl methacrylate)$_{20}$ (methyl methacrylate)$_{60}$ (poly(ethylene glycol) methyl ether acrylate, mw=2054)$_{20}$; (N,N-dimethylaminoethyl acrylate)$_{40}$ (methyl methacrylate)$_{40}$ (poly-(ethylene glycol) methyl ether acrylate, mw=218)$_{20}$; (vinyl acetate)$_{30}$ (methyl methacrylate)$_{50}$ (poly(ethylene glycol) methyl ether acrylate, mw=218)$_{20}$; (vinyl butyl ether)$_{20}$ (methyl methacrylate)$_{60}$ (poly(ethylene glycol) methyl ether acrylate, mw=218)$_{20}$; (hexyl acrylate)$_{40}$ (styrene)$_{40}$ (poly (ethylene glycol) methyl ether acrylate, mw=404)$_{20}$; (hexyl acrylate)$_{30}$ (dimethyl styrene)$_{50}$ (poly(ethylene glycol) methyl ether acrylate, mw=404)$_{20}$; (hexyl acrylate)$_{20}$ (trifluoromethyl styrene)$_{60}$ (poly(ethylene glycol) methyl ether acrylate, mw=404)$_{20}$; (hexyl acrylate)$_{40}$ (tetrafluoropropyl methacrylate)$_{40}$ (poly(ethylene glycol) methyl ether acrylate, mw=2054)$_{20}$; (hexyl acrylate)$_{30}$ (glycidyl methacrylate)$_{50}$ (poly(ethylene glycol) methyl ether acrylate, mw=2054)$_{20}$; (hexyl acrylate)$_{20}$ (glycidyl acrylate)$_{60}$ (poly(ethylene glycol) methyl ether acrylate, mw=2054)$_{20}$; (hexyl acrylate)$_{40}$ (maleimide)$_{40}$ (poly (ethylene glycol) methyl ether acrylate, mw=218)$_{20}$; (hexyl acrylate)$_{50}$ (n-hexyl maleimide)$_{30}$ (poly(ethylene glycol) methyl ether acrylate, mw=218)$_{20}$; (hexyl acrylate)$_{40}$ (n-vinyl maleimide)$_{40}$ (poly(ethylene glycol) methyl ether acrylate, mw=218)$_{20}$; (hexyl acrylate)$_{40}$ (methyl methacrylate)$_{40}$ (vinyl pyrrolidone)$_{20}$; (hexyl acrylate)$_{40}$ (methyl methacrylate)$_{40}$ (vinyl 4-methylpyrrolidone)$_{20}$; (hexyl acrylate)$_{40}$ (methyl methacrylate)$_{40}$ (vinyl imidazole)$_{20}$; (hexyl acrylate)$_{40}$ (methyl methacrylate)$_{40}$ (acrylamide)$_{20}$; (hexyl acrylate)$_{40}$ (methyl methacrylate)$_{40}$ (4-methyl acrylamide)$_{20}$; (hexyl acrylate)$_{40}$ (methyl methacrylate)$_{30}$ (poly(ethylene glycol) methyl ether acrylate, mw=404)$_{20}$ (D1)$_{10}$; (hexyl acrylate)$_{40}$ (methyl methacrylate)$_{30}$ (poly(ethylene glycol) methyl ether acrylate, mw=404)$_{20}$ (D1)$_{10}$; (hexyl acrylate)$_{40}$ (methyl methacrylate)$_{30}$ (poly(ethylene glycol) methyl ether acrylate, mw=404)$_{20}$ (D1)$_{10}$; (hexyl acrylate)$_{40}$ (methyl methacrylate)$_{30}$ (poly(ethylene glycol) methyl ether acrylate, mw=404)$_{20}$ (D1)$_{10}$; (hexyl acrylate)$_{40}$ (methyl methacrylate)$_{30}$ (poly(ethylene glycol) methyl ether acrylate, mw=404)$_{20}$ (D4)$_{10}$; (hexyl acrylate)$_{40}$ (methyl methacrylate)$_{30}$ (poly(ethylene glycol) methyl ether acrylate, mw=404)$_{20}$ (D4)$_{10}$; (hexyl acrylate)$_{40}$ (styrene)$_{30}$ (poly(ethylene glycol) methyl ether acrylate, mw=404)$_{20}$ (D1)$_{10}$; (hexyl acrylate)$_{40}$ (styrene)$_{30}$ (vinyl pyrrolidone)$_{20}$ (D1)$_{10}$; (hexyl acrylate)$_{50}$ (methyl methacrylate)$_{45}$ (poly (ethylene glycol) methyl ether acrylate, mw=404)$_{5}$; (hexyl acrylate)$_{50}$ (methyl methacrylate)$_{40}$ (poly(ethylene glycol) methyl ether acrylate, mw=404)$_{10}$; (hexyl acrylate)$_{50}$ (methyl methacrylate)$_{35}$ (poly(ethylene glycol) methyl ether acrylate, mw=404)$_{35}$; (methyl methacrylate)$_{40}$ (hexyl acrylate)$_{60}$/surfactant; (methyl methacrylate)$_{40}$ (butyl acrylate)$_{60}$/surfactant; and (styrene)$_{30}$ (octadecyl acrylate)$_{70}$/surfactant, where D1 and D4 are UV absorbers given by the formula

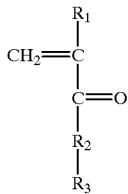

where $R_1$=H, $R_2$=O, and $R_3$ are

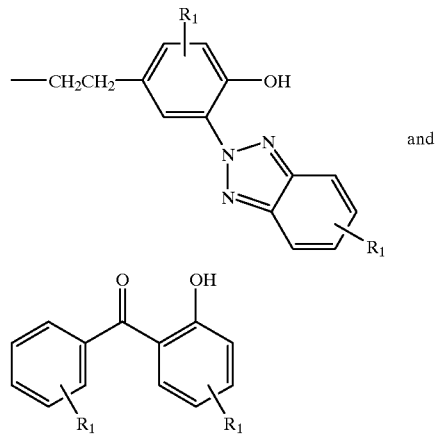

respectively.

20. The ink-jet ink of claim 6 wherein said primer core/shell polymer is selected from the group consisting of (hexyl acrylate)$_{40}$ (methyl methacrylate)$_{40}$ (acrylic acid)$_{20}$; (hexyl acrylate)$_{60}$ (methyl methacrylate)$_{20}$ (methacrylic acid)$_{20}$; (hexyl acrylate)$_{40}$ (methyl methacrylate)$_{40}$ (maleic acid)$_{20}$; (hexyl acrylate)$_{40}$ (methyl methacrylate)$_{40}$ (vinyl benzoic acid)$_{20}$; (hexyl acrylate)$_{40}$ (methyl methacrylate)$_{40}$ (vinyl sulfonamide)$_{20}$; (hexyl acrylate)$_{40}$ (methyl methacrylate)$_{40}$ (sodium acrylate)$_{20}$; (hexyl acrylate)$_{40}$ (methyl methacrylate)$_{40}$ (ammonium acrylate)$_{20}$; (hexyl acrylate)$_{40}$ (methyl methacrylate)$_{40}$ (ammonium methacrylate)$_{20}$; (ethyl acrylate)$_{40}$ (methyl methacrylate)$_{40}$ (acrylamidopropanetriethylammonium chloride)$_{20}$; (propyl acrylate)$_{40}$ (methyl methacrylate)$_{40}$ (vinyl pyridine hydrochloride)$_{20}$; (butyl acrylate)$_{40}$ (methyl methacrylate)$_{40}$ (sodium vinyl phosphate)$_{20}$; (hexyl acrylate)$_{40}$ (methyl methacrylate)$_{40}$ (sodium styrene sulfonate)$_{20}$; (hexyl acrylate)$_{30}$ (methyl methacrylate)$_{50}$ (sodium acrylamidopropanesulfonate)$_{20}$; (styrene)$_{75}$ (acrylic acid)$_{20}$ (di)$_{5}$; (styrene)$_{55}$ (acrylic acid)$_{40}$ (d4)$_{5}$; (styrene)$_{40}$ (methyl methacrylate)$_{40}$ (acrylic acid)$_{20}$; (ethyl acrylate)$_{55}$ (acrylic acid)$_{40}$ (d1)$_{5}$; (styrene)$_{40}$ (ethyl acrylate)$_{40}$ (acrylic acid)$_{20}$; (methyl methacrylate)$_{40}$ (hexyl acrylate)$_{55}$ (d1)$_{5}$; (methyl methacrylate)$_{40}$ (butyl acrylate)$_{55}$ (d1)$_{5}$; (styrene)$_{30}$ (octadecyl acrylate)$_{65}$ (d1)$_{5}$; and (methyl methacrylate)$_{32}$ (hexyl acrylate)$_{46}$ (poly(ethylene glycol) methyl ether acrylate, mw=404)$_{2}$ (acrylic acid)$_{10}$, where d1 and d4 are UV absorber moieties given by the formula

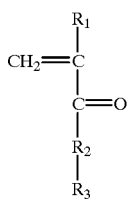

where
R$_1$=H, R$_2$=O, and R$_3$ are

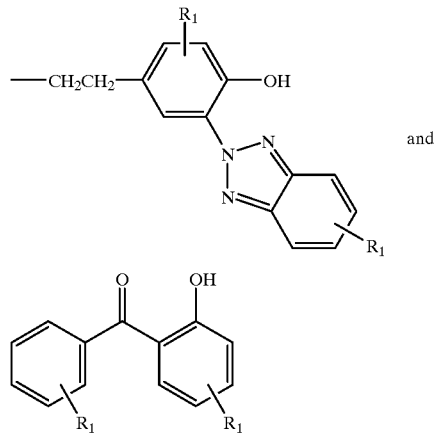

and respectively.

21. The ink-jet ink of claim 1 wherein said durable core/shell polymer has a concentration in said ink within a range of about 0.005 to 50 wt % and wherein said primer core/shell polymer has a concentration in said ink within a range of about 0.005 to 50 wt %, where said durable core/shell polymer relative to said primer core/shell polymer is present in a ratio within a range of 100:1 to 1:100.

22. The ink-jet ink of claim 1 wherein said vehicle comprises water and at least one water-miscible organic solvent.

23. The ink-jet ink of claim 22 wherein said at least one water-miscible organic solvent is selected from the group consisting of aliphatic alcohols, aromatic alcohols, diols, glycol ethers, poly(glycol) ethers, caprolactams, formamides, acetamides, and long chain alcohols.

24. The ink-jet ink of claim 23 wherein said at least one water-miscible organic solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

25. The ink-jet ink of claim 24 wherein said water-miscible organic solvent is selected from the group consisting of N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

26. The ink-jet ink of claim 23 wherein said solvent has a concentration in said ink within a range of about 5 to 50 wt %.

27. The ink-jet ink of claim 26 wherein said concentration is within the range of about 10 to 25 wt %.

28. A dual encapsulated colorant wherein, upon printing on a print medium, said colorant is encapsulated by a primer core/shell polymer to form a primer-coated colorant, and said primer-coated colorant is encapsulated by a durable core/shell polymer.

29. The dual encapsulated colorant of claim 28 wherein said colorant is a pigment.

30. The dual encapsulated colorant of claim 28 wherein said colorant is a dye.

31. A method for providing a durable, smear-fast colorant, said method comprising the steps of
(a) encapsulating said colorant with a primer core/shell polymer to form a primer-coated colorant; and
(b) encapsulating said primer-coated colorant with a durable core/shell polymer.

32. A method for providing a durable, smear-fast colorant, said method comprising the steps of
(a) associating said colorant with a primer core/shell polymer to form a primer/colorant combination; and
(b) associating said primer/colorant combination with a durable core/shell polymer.

33. A method for preparing a primer or additive polymer for use in a dual encapsulating system comprising said primer or additive polymer coating or associated with a colorant, respectively, and encapsulated with a durable core/shell polymer, said method comprising either
(a) bulk polymerizing constituent monomers in a solvent to provide a polymer solution; or
(b) emulsion polymerizing of constituent monomers in a suspending medium to provide a polymer suspension.

* * * * *